(12) United States Patent
Osborn et al.

(10) Patent No.: US 12,069,173 B2
(45) Date of Patent: Aug. 20, 2024

(54) KEY RECOVERY BASED ON CONTACTLESS CARD AUTHENTICATION

(71) Applicant: Capital One Services, LLC, McLean, VA (US)

(72) Inventors: Kevin Osborn, Newton, MA (US);
Jaikishan Prasad, Arlington, VA (US);
Jose Catala Castellar, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 290 days.

(21) Appl. No.: 17/551,670

(22) Filed: Dec. 15, 2021

(65) Prior Publication Data
US 2023/0188340 A1    Jun. 15, 2023

(51) Int. Cl.
H04L 9/08    (2006.01)

(52) U.S. Cl.
CPC .......... *H04L 9/0897* (2013.01); *H04L 9/0819* (2013.01); *H04L 9/0866* (2013.01); *H04L 9/0869* (2013.01)

(58) Field of Classification Search
CPC ... H04L 9/0897; H04L 9/0819; H04L 9/0866; H04L 9/0869
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Stephen T Gundry
(74) *Attorney, Agent, or Firm* — KDW FIRM PLLC

(57) ABSTRACT

Systems, methods, apparatuses, and computer-readable media for key recovery based on contactless card cryptograms. A server may receive, from an application, a request to recover a private key for a digital wallet, the request includes a first cryptogram generated by a contactless card. The server may decrypt the first cryptogram based on a key for the contactless card. The server may determine, based on the decryption, a unique identifier of the contactless card and a diversification factor associated with the digital wallet. The server may generate the private key based on the unique identifier and the diversification factor. The server may transmit the private key to the application via a network.

20 Claims, 18 Drawing Sheets

(56) References Cited

U.S. PATENT DOCUMENTS

| | | |
|---|---|---|
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,080,259 B1 * | 7/2006 | Nakanishi ............... G06Q 40/02 713/168 |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |

(56) References Cited

U.S. PATENT DOCUMENTS

| | | |
|---|---|---|
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Andau et al. |
| 2008/0110983 A1 | 5/2008 | Ashfield |
| 2008/0120711 A1 | 5/2008 | Dispensa |

(56) References Cited

U.S. PATENT DOCUMENTS

| | | |
|---|---|---|
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |

(56) References Cited

U.S. PATENT DOCUMENTS

| | | |
|---|---|---|
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0324789 A1 | 11/2015 | Dvorak et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1* | 9/2018 | Buer ............... G06F 21/76 |
| 2018/0270214 A1 | 9/2018 | Caterino et al. |
| 2018/0294959 A1* | 10/2018 | Traynor ............ H04L 65/1076 |
| 2018/0300716 A1* | 10/2018 | Carlson ............ G06Q 40/02 |
| 2018/0302396 A1* | 10/2018 | Camenisch ........ H04L 9/3236 |
| 2018/0315050 A1 | 11/2018 | Hammad |
| 2018/0316666 A1* | 11/2018 | Koved ............. H04L 63/045 |
| 2018/0322486 A1* | 11/2018 | Deliwala .......... G06Q 20/1085 |
| 2018/0359100 A1* | 12/2018 | Gaddam .......... H04L 9/3215 |
| 2019/0014107 A1* | 1/2019 | George ............ H04W 12/63 |
| 2019/0019375 A1* | 1/2019 | Foley ............. G06Q 20/352 |
| 2019/0036678 A1* | 1/2019 | Ahmed ........... H04L 9/008 |
| 2019/0238517 A1* | 8/2019 | D'Agostino ....... H04L 63/0428 |
| 2020/0106619 A1* | 4/2020 | Osborn ........... H04L 9/002 |
| 2021/0365938 A1 | 11/2021 | Radu |
| 2023/0006994 A1* | 1/2023 | Krishna .......... H04L 9/0869 |
| 2023/0050003 A1* | 2/2023 | Ureche .......... H04L 9/3234 |
| 2023/0050481 A1* | 2/2023 | Nagaraja ......... H04L 9/0894 |
| 2023/0177489 A1* | 6/2023 | Chan ............. G06Q 20/3672 705/66 |
| 2023/0188340 A1* | 6/2023 | Osborn .......... G06Q 20/3672 380/286 |
| 2023/0231715 A1* | 7/2023 | Le Saint ........ H04L 63/061 713/155 |
| 2023/0281292 A1* | 9/2023 | Wu .............. H04L 9/0894 713/189 |
| 2023/0299942 A1* | 9/2023 | Be'Ery .......... H04L 9/0894 713/171 |
| 2023/0344649 A1* | 10/2023 | Zamani ......... H04L 9/50 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 20190045753 A | 5/2019 |
| NO | 2008055170 A2 | 5/2008 |
| WO | 0049586 A1 | 8/2000 |
| WO | 2006070189 A2 | 7/2006 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2020110079 A1 | 6/2020 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

(56) References Cited

OTHER PUBLICATIONS

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-US/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/US/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared - or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

(56) References Cited

OTHER PUBLICATIONS

Estevez, "Hierarchical Deterministic (HD) Wallet", Investopedia.com [online], Aug. 15, 2021. Retrieved from the Internet URL: <https://www.investopedia.com/terms/h/hd-wallet-hierarchical-deterministic-wallet.asp>, Retrieved on Dec. 7, 2021, 6 pages.
Author Unknown, "BIP 0032", Bitcoin Wiki [online], Aug. 21, 2020, Retrieved from Internet URL: <https://en.bitcoin.t/wiki/BIP_0032>, Retrieved on Dec. 7, 2021, 6 pages.
International Search Report and Written Opinion dated Apr. 4, 2023, for corresponding PCT/US2022/050885 (14 pages).

\* cited by examiner

KEY RECOVERY BASED ON CONTACTLESS CARD AUTHENTICATION

BACKGROUND

Digital wallets have numerous advantages but pose security and privacy challenges. The most common risks include theft and lost (or forgotten) access keys. Furthermore, custodial wallets are tied to a specific institution and do not permit portability. Proxy wallets have risks of security breaches and/or theft, leaving access keys being compromised. Hardware wallets may provide recovery seeds, but these seeds are prone to theft and/or other types of loss (e.g., when a user cannot recall the seeds or cannot locate their record of the seeds).

SUMMARY

Systems, methods, apparatuses, and computer-readable media for key recovery based on contactless card authentication. In one aspect, a method, includes receiving, by a server from an application, a request to recover a private key for a digital wallet, the request includes a first cryptogram generated by a contactless card, decrypting, by the server, the first cryptogram based on a key for the contactless card, determining, by the server based on the decryption, a unique identifier of the contactless card and a diversification factor associated with the digital wallet in a hardware security module, generating, by the server based on the unique identifier and the diversification factor, the private key, and transmitting, by the server to the application via a network, the private key.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
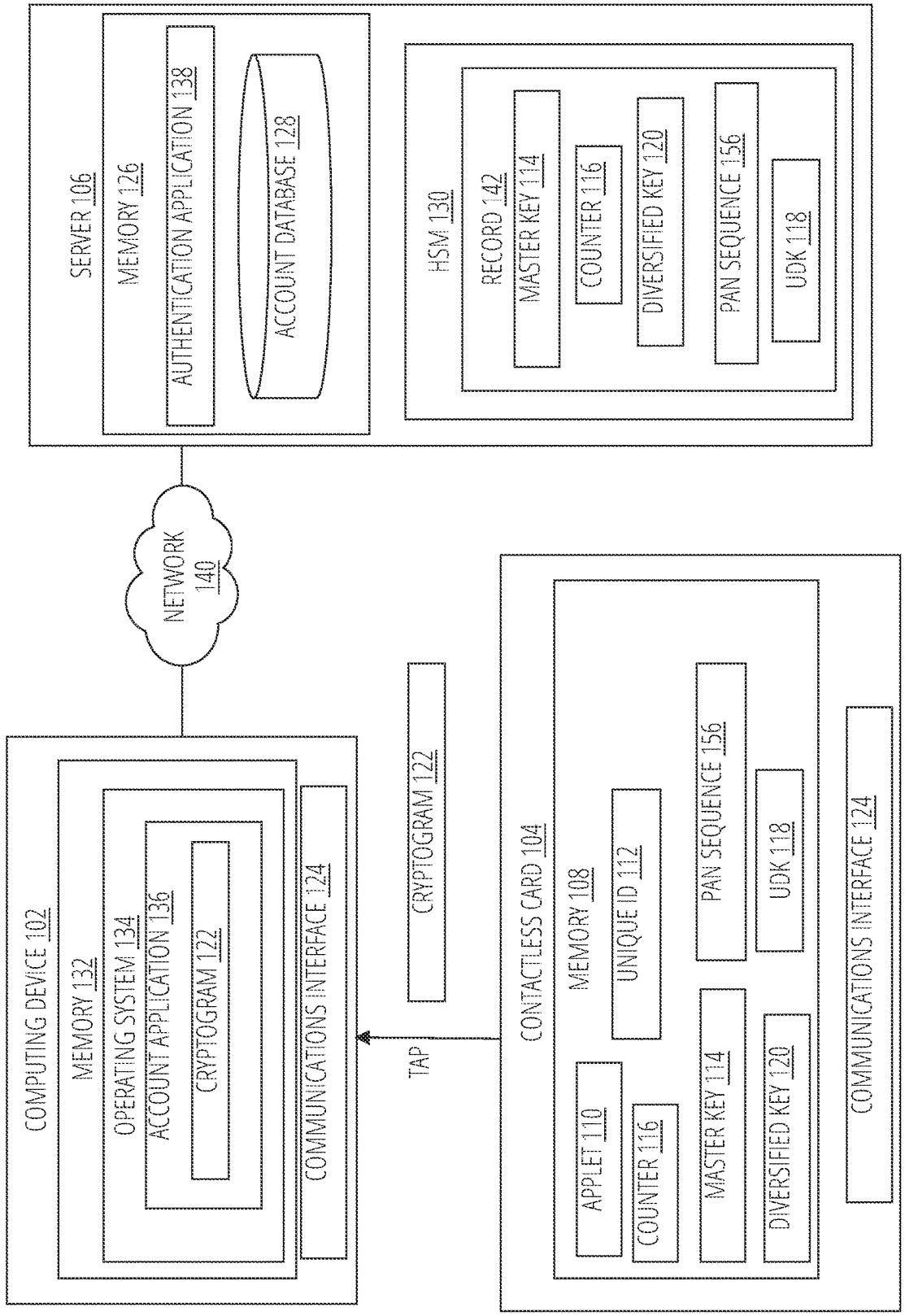
FIG. 1A illustrates an aspect of the subject matter in accordance with one embodiment.

Embodiments disclosed herein provide techniques for secure recovery of cryptographic keys used to access digital wallets, such as cryptocurrency wallets, using a contactless card. To create a digital wallet, a computing device may instruct a contactless card to generate a cryptogram. An application executing on the computing device may receive the cryptogram via wireless communications with the contactless card and transmit the cryptogram to a server for verification. If the server verifies the cryptogram, the server may create a private key which is required to access or otherwise perform operations using the digital wallet. The server may then create a public key corresponding to the private key and generate a wallet address for the digital wallet based on the public key. The server may then store one or more inputs to a cryptographic algorithm used to create the private key in a hardware security module (HSM). The inputs may include one or more of a key (or keys) associated with the contactless card, a unique identifier of the contactless card, and a diversification factor. In some embodiments, the keys may be stored in the HSM, while the unique identifier and diversification factor may be provided as inputs to the HSM for diversifying the private key (e.g., the unique identifier and diversification factor need not be stored in the HSM).

The server may securely transmit the private key, public key, and wallet address to the application, which may generate a digital wallet and store the private key, public key, and wallet address therein. In some embodiments, when the user attempts to access the digital wallet, cryptographic verification using the contactless card may be used to authenticate access to the digital wallet. If the cryptographic verification is not successful, the user may be restricted from accessing the wallet, thereby improving the security of the wallet.

Because the digital wallet stores obfuscated versions of the private key, the user may lose, forget, or otherwise not be able to provide the private key as a precondition to performing transactions with the digital wallet (e.g., to transfer cryptocurrency, etc.). Advantageously, embodiments disclosed herein provide a secure solution to recover the private key using the contactless card. Generally, to recover the private key, the contactless card may generate a cryptogram that is verified by the server. If the server is able to verify the cryptogram, the inputs used to generate the private key may be provided to the HSM. The server may then recreate the private key, and transmit the recreated private key to the requesting application and/or device in one or more portions.

Advantageously, embodiments disclosed herein provide secure techniques to recover private keys used to access digital wallets using cryptograms generated by contactless cards. By leveraging cryptograms, embodiments of the disclosure may securely verify the identity of the user with minimal risk of fraudulent activity. Furthermore, doing so ensures that the private key is are only restored when the user has access to a contactless card that facilitates the cryptogram verification with the server. Further still, the security of the digital wallet is enhanced by requiring the cryptographic verification as a precondition to accessing the digital wallet and/or recovering the private key.

With general reference to notations and nomenclature used herein, the detailed descriptions herein may be presented in terms of program procedures executed on a computer or network of computers. These procedural descriptions and representations are used by those skilled in the art to effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-α (or 123a) may include components 123-1, 123-2, 123-3, 123-4, and 123-5. The embodiments are not limited in this context.

FIG. 1A depicts an exemplary computing architecture 100, also referred to as a system, consistent with disclosed embodiments. Although the computing architecture 100 shown in FIGS. 1A-1C has a limited number of elements in a certain topology, it may be appreciated that the computing architecture 100 may include more or less elements in alternate topologies as desired for a given implementation.

The computing architecture 100 comprises one or more computing devices 102, one or more servers 106, and one or more contactless cards 104. The contactless card 104 is representative of any type of card, such as a credit card, debit card, ATM card, gift card, payment card, smart card, and the like. The contactless card 104 may comprise one or more communications interfaces 124, such as a radio frequency identification (RFID) chip, configured to communicate with a communications interface 124 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device may be used as an example of the computing device 102, but should not be considered limiting of the disclosure. The server 106 is representative of any type of computing device, such as a server, workstation, compute cluster, cloud computing platform, virtualized computing system, and the like. Although not depicted for the sake of clarity, the computing device 102, contactless card 104, and server 106 each include one or more processor circuits, e.g., to execute programs, code, and/or instructions.

As shown, a memory 108 of the contactless card 104 includes an applet 110, a counter 116, one or more master keys 114, one or more diversified keys 120, a unique ID 112, a primary account number (PAN) sequence number 156, and one or more Unique Derived Keys (UDKs) 118. The unique ID 112 may be any identifier that uniquely identifies the contactless card 104 relative to other contactless cards 104. The PAN sequence 156 may include a counter value stored by the contactless card 104. The applet 110 is executable code configured to perform some or all of the operations described herein. The counter 116 is a value that is synchronized between the contactless card 104 and server 106. The counter 116 may comprise a number that changes each time data is exchanged between the contactless card 104 and the server 106 (and/or the contactless card 104 and the computing device 102). The counter 116, master keys 114, diversified keys 120, UDKs 118, PAN sequence 156, and/or unique ID 112 are used to provide security in the system 100 as described in greater detail below.

As shown, a memory 132 of the computing device 102 includes an instance of an operating system 134. Example operating systems include the Android® OS, iOS®, macOS®, Linux®, and Windows® operating systems. As shown, the operating system 134 includes an account application 136. The account application 136 allows users to perform various account-related operations, such as managing digital wallets, processing transactions using the wallet, processing blockchain and/or cryptocurrency transactions, activating payment cards, viewing account balances, purchasing items, processing payments, and the like. In some embodiments, a user may authenticate using authentication credentials to access certain features of the account application 136. For example, the authentication credentials may include a username (or login) and password, biometric credentials (e.g., fingerprints, Face ID, etc.), and the like.

As shown, a memory 126 of the server 106 includes an authentication application 138 and an account database 128. The account database 128 generally includes information related to an account holder (e.g., one or more users), one or more accounts of the account holder, and one or more contactless cards 104 of the account.

As stated, the account application 136 may be used to create, manage, access, or otherwise use digital wallets. A digital wallet allows one party to make electronic transactions with another party. In some embodiments, the digital wallet is a cryptocurrency wallet that stores private keys and/or public keys for cryptocurrencies. The cryptocurrencies may be any type of cryptocurrency, such as Bitcoin, Ethereum, and the like. To create a digital wallet, the user may authenticate into the account using authentication credentials. The account application 136 may then instruct the user to tap the contactless card 104 to the computing device 102.

In the embodiment depicted in FIG. 1A, the user may tap the contactless card 104 to the computing device 102 (or otherwise bring the contactless card 104 within communications range of the communications interface 124 of the device 102). The account application 136 may then instruct the applet 110 to generate a cryptogram 122. The cryptogram 122 may be generated based on any suitable cryptographic technique. In some embodiments, the cryptogram 122 may be based on the unique ID 112 of the contactless card 104. In some embodiments, the applet 110 may include the cryptogram 122 and an unencrypted identifier (e.g., the counter 116, the PAN sequence 156, the unique ID 112, and/or any other unique identifier) as part of a data package including the cryptogram 122. In at least one embodiment, the data package is an NDEF file.

As stated, the computing architecture 100 is configured to implement key diversification to secure data, which may be referred to as a key diversification technique herein. Generally, the server 106 (or another computing device) and the contactless card 104 may be provisioned with the same master key 114 (also referred to as a master symmetric key). More specifically, each contactless card 104 is programmed with a distinct master key 114 that has a corresponding pair in the hardware security module (HSM) 130 of the server 106. For example, when a contactless card 104 is manufactured, a unique master key 114 may be programmed into the memory 108 of the contactless card 104. Similarly, the unique master key 114 may be stored in a record 142 in the HSM 130.

Furthermore, when a given card 104 is manufactured, a UDK 118 may be diversified from the master key 114 via an HSM function that takes, as input, a diversification factor and a reference to the master key 114 index in the HSM 130 (e.g., an index to the record 142). In some embodiments, the diversification factor may be the unique ID 112 and PAN sequence 156 of the contactless card 104. The UDK 118 may be stored in the contactless card 104 and the record 142 of the HSM 130. The master key 114 and UDK 118 may be kept secret from all parties other than the contactless card 104 and server 106, thereby enhancing security of the system 100. Although depicted as being stored in the record 142, in some embodiments, the counter 116 and/or PAN sequence 156 are not stored in the HSM 130. For example, the unique ID 112, counter 116, and PAN sequence 156 may be stored in the account database 128.

In some embodiments, to generate the cryptogram 122, the applet 110 may provide the UDK 118, unique ID 112, and a diversification factor as input to a cryptographic algorithm, thereby producing a diversified key 120. In some embodiments, the diversification factor is the counter 116. In other embodiments, the PAN sequence 156 is the diversification factor. The diversified key 120 may then be used to encrypt some data, such as the diversification factor (e.g., the counter 116 and/or the PAN sequence 156) or other sensitive data. The applet 110 and the server 106 may be configured to encrypt the same type of data to facilitate the decryption and/or verification processing of a cryptogram.

As stated, the UDKs 118 of the contactless card 104 and server 106 may be used in conjunction with the counters 116 to enhance security using key diversification. As stated, the counters 116 comprise values that are synchronized between the contactless card 104 and server 106. The counter 116 may comprise a number that changes each time data is exchanged between the contactless card 104 and the server 106 (and/or the contactless card 104 and the computing device 102). When preparing to send data (e.g., to the server 106 and/or the device 102), the applet 110 of the contactless card 104 may increment the counter 116. The applet 110 of the contactless card 104 may then provide the UDK 118, unique ID 112, and counter 116 as input to a cryptographic algorithm, which produces a diversified key 120 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety. In some embodiments, the PAN sequence 156 is used as input to the cryptographic algorithm instead of the counter 116 to generate the diversified key 120, e.g., by encrypting the UDK 118, unique ID 112 and PAN sequence 156.

The applet 110 may then encrypt some data (e.g., the unique ID 112, the counter 116, the PAN sequence 156, a command, and/or any other data) using the diversified key 120 and the data as input to the cryptographic algorithm. For example, encrypting the unique ID 112 with the diversified key 120 may result in an encrypted unique ID 112 (e.g., a cryptogram 122). As stated, the applet 110 and the server 106 may be configured to encrypt the same data.

In some embodiments, two diversified keys 120 may be generated, e.g., based on one or more portions of the input to the cryptographic function. In some embodiments, the two diversified keys 120 are generated based on two distinct master keys 114, two distinct UDKs 118, the unique ID 112, and the counter 116 (or the PAN sequence 156). In such embodiments, a message authentication code (MAC) is generated using one of the diversified keys 120, and the MAC may be encrypted using the other one of the diversified keys 120. The MAC may be generated based on any suitable data input to a MAC algorithm, such as sensitive data, the unique ID 112, the counter 116, and/or the PAN sequence 156. More generally, the applet 110 and the server 106 may be configured to generate the MAC based on the same data. In some embodiments, the cryptogram 122 is included in a data package such as an NDEF file. The account application 136 may then read the data package including cryptogram 122 via the communications interface 124 of the computing device 102.

Figure 1B:
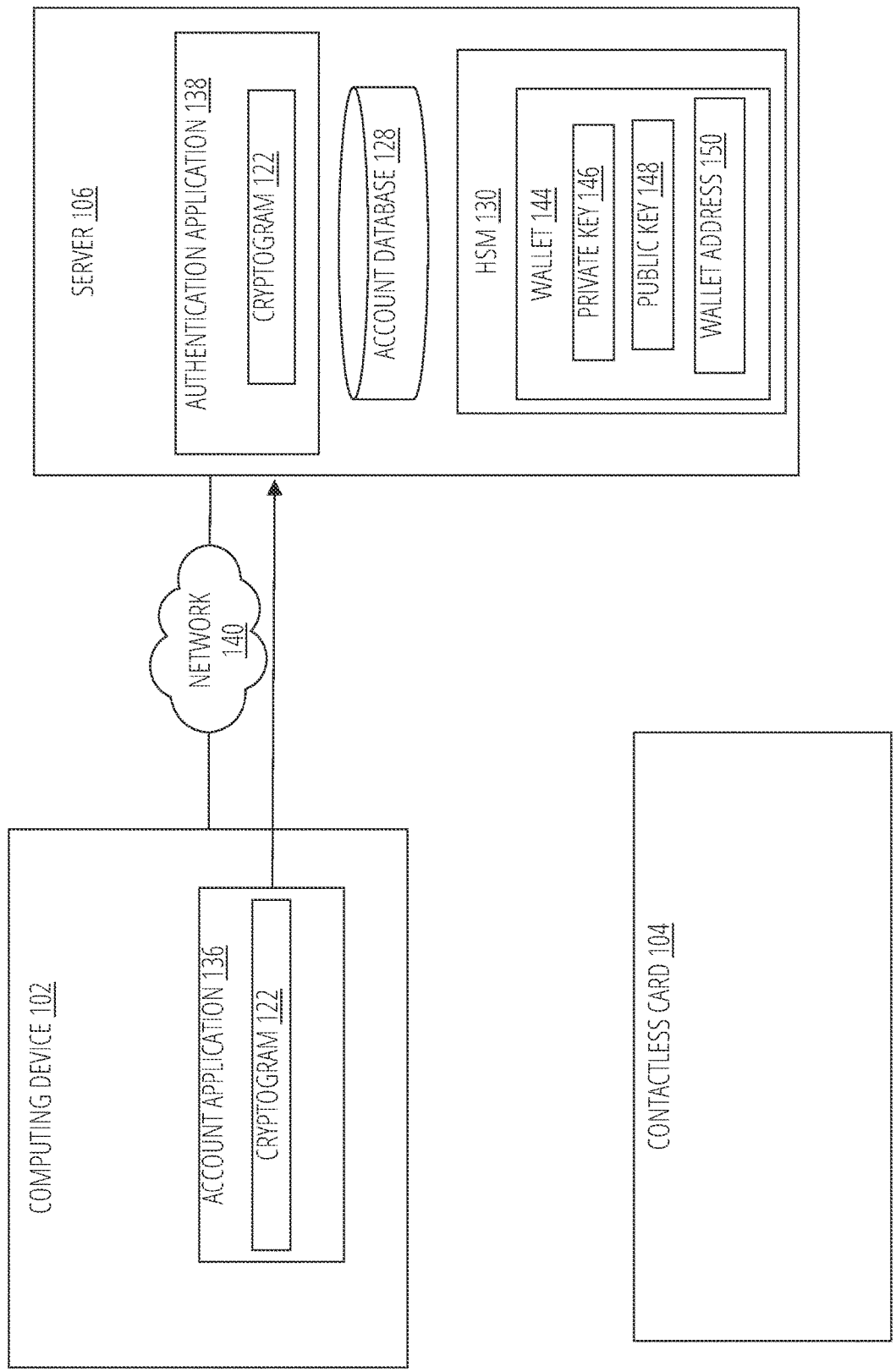
FIG. 1B illustrates an aspect of the subject matter in accordance with one embodiment.

FIG. 1B depicts an embodiment where the account application 136 transmits the cryptogram 122 to the server 106. The server 106 may provide the cryptogram 122 to the authentication application 138 and/or the HSM 130 for verification based at least in part on the instance of the master key 114 and/or UDK 118 stored by the server 106. In some embodiments, the authentication application 138 and/or the HSM 130 may identify the UDK 118 (or master key 114) and counter 116 using the unencrypted unique ID 112 provided to the server 106. In examples where the PAN sequence 156 is used to generate the cryptogram 122, the server 106 may identify the PAN sequence 156 in the account database 128 and/or HSM 130 using the unencrypted unique ID 112. In some examples, the authentication application 138 may provide the UDK 118, unique ID 112, and counter 116 as input to the cryptographic function of the HSM 130, which produces one or more diversified keys 120 as output. In other embodiments, the server encrypts the UDK 118, unique ID 112, and PAN sequence 156 to generate the diversified keys 120. The resulting diversified keys 120 may correspond to the diversified keys 120 of the contactless card 104, which may be used to decrypt the cryptogram 122 and/or verify the MAC once decrypted. For example, the server 106 may generate a MAC based on the same data as the applet 110, e.g., the sensitive data, the unique ID 112, the counter 116, and/or the PAN sequence 156. If the MAC generated by the server 106 matches the decrypted MAC in the cryptogram 122, the server 106 may verify or otherwise authenticate the cryptogram 122.

Regardless of the decryption technique used, the authentication application 138 and/or the HSM 130 may successfully decrypt the cryptogram 122 and verify the MAC, thereby verifying or authenticating the cryptogram 122. If the decryption and/or MAC verification is successful, the authentication application 138 and/or the HSM 130 may generate a digital wallet 144 for the user. Generally, to create the digital wallet 144, a private key 146 may be generated. In some embodiments, a random number is provided as input into an encryption (0r hash) algorithm, such as the SHA-2 algorithm or any other suitable algorithm, to generate a private key 146 of any length. In other embodiments, the unique ID 112 of the contactless card 104 and the PAN sequence 156 are concatenated and provided as input to the hash algorithm to generate the private key 146. In other embodiments, the unique ID 112 of the contactless card 104 and the counter 116 are concatenated and provided as input to the hash algorithm to generate the private key 146.

In other embodiments, the master key 114, the unique ID 112, and the counter 116 of the contactless card 104 are concatenated and provided as input to the hash algorithm to generate the private key 146. In embodiments where the master key 114 is used to generate the private key 146, a first master key 114 of the contactless card 104 may be used to generate the cryptogram 122, and a second master key 114 of the contactless card 104 may be used to generate the private key 146, where the first and second master keys 114 are distinct keys. In other embodiments, one of the diversified keys 120, the unique ID 112, and the counter 116 of the contactless card 104 are concatenated and provided as input to the hash algorithm to generate the private key 146. In other embodiments, one of the UDKs 118, the unique ID 112, and the counter 116 of the contactless card 104 are concatenated and provided as input to the hash algorithm to generate the private key 146. Regardless of the input used to generate the private key 146, in some embodiments, salt (e.g., random data) is included in the input to the hash algorithm to generate the private key 146.

The private key 146 may then be used to generate a corresponding public key 148. In some embodiments, the public key 148 may be generated based on the private key 146 using the Elliptic Curve Digital Signature Algorithm (ECDSA). In some embodiments, the public key 148 may be concatenated (or compressed), e.g., using a hash algorithm. In some embodiments, salt is used to generate the public key 148. A wallet address 150 may be generated for the digital wallet 144 based on the public key 148, e.g., by hashing the public key 148. Although depicted as being stored in the HSM 130, in some embodiments, the digital wallet 144 is not permanently stored in the HSM 130. Instead, as described in greater detail herein, elements used to recreate the private key 146 may be stored in the HSM 130 and/or the account database 128. For example, the unique ID 112 and the counter 116 may be stored in the HSM 130 and/or the account database 128. In another example, the unique ID 112 and the PAN sequence 156 may be stored in the HSM 130 and/or the account database 128.

In some embodiments, the private key 146 and/or public key 148 may be further diversified, e.g., to create hierarchical deterministic keys. For example, the private key 146 may be diversified with the counter 116, the unique ID 112, a salt value 154, or any other predetermined seed value. Doing so may diversify the private key 146. Similarly, the public key 148 may be diversified with the counter 116, the unique ID 112, a salt value 154, or any other predetermined seed value to create a diversified public key 148. In such embodiments, any seed value that is used to diversify the private key 146 and/or public key 148 may be stored in a recovery record 152 of the account database 128 and/or HSM 130. More generally, the private key 146 and/or public key 148 may be diversified using the seed value a plurality of times, thereby generating a tree (or hierarchy) of diversified private keys 146 and/or diversified public keys 148. In such embodiments, one or more paths of the tree (or hierarchy) may be used to specify different diversified keys. More generally, each node of the tree may correspond to a diversified public key and/or a diversified child key. Given the private and public key of a node of the tree, the diversified private and public keys of all descendant nodes in the tree may be derived. Furthermore, each leaf node in the tree may correspond to a diversified public key and/or a diversified child key. In some embodiments, the path is further used to specify attributes for a transaction, such as a currency, an amount of the currency, a first wallet address for the transaction (e.g., a sending wallet address), a second wallet address for the transaction (e.g., a recipient wallet address), and any other attribute. These attributes may be stored in a given node of the tree.

Returning to the decryption, if the authentication application 138 is unable to decrypt the cryptogram 122 (and/or is unable to verify the MAC) the authentication application 138 does not validate the cryptogram 122. In such an example, the authentication application 138 determines to refrain from generating a digital wallet. The authentication application 138 may transmit an indication of the failed decryption and/or verification to the computing device 102.

Figure 1C:
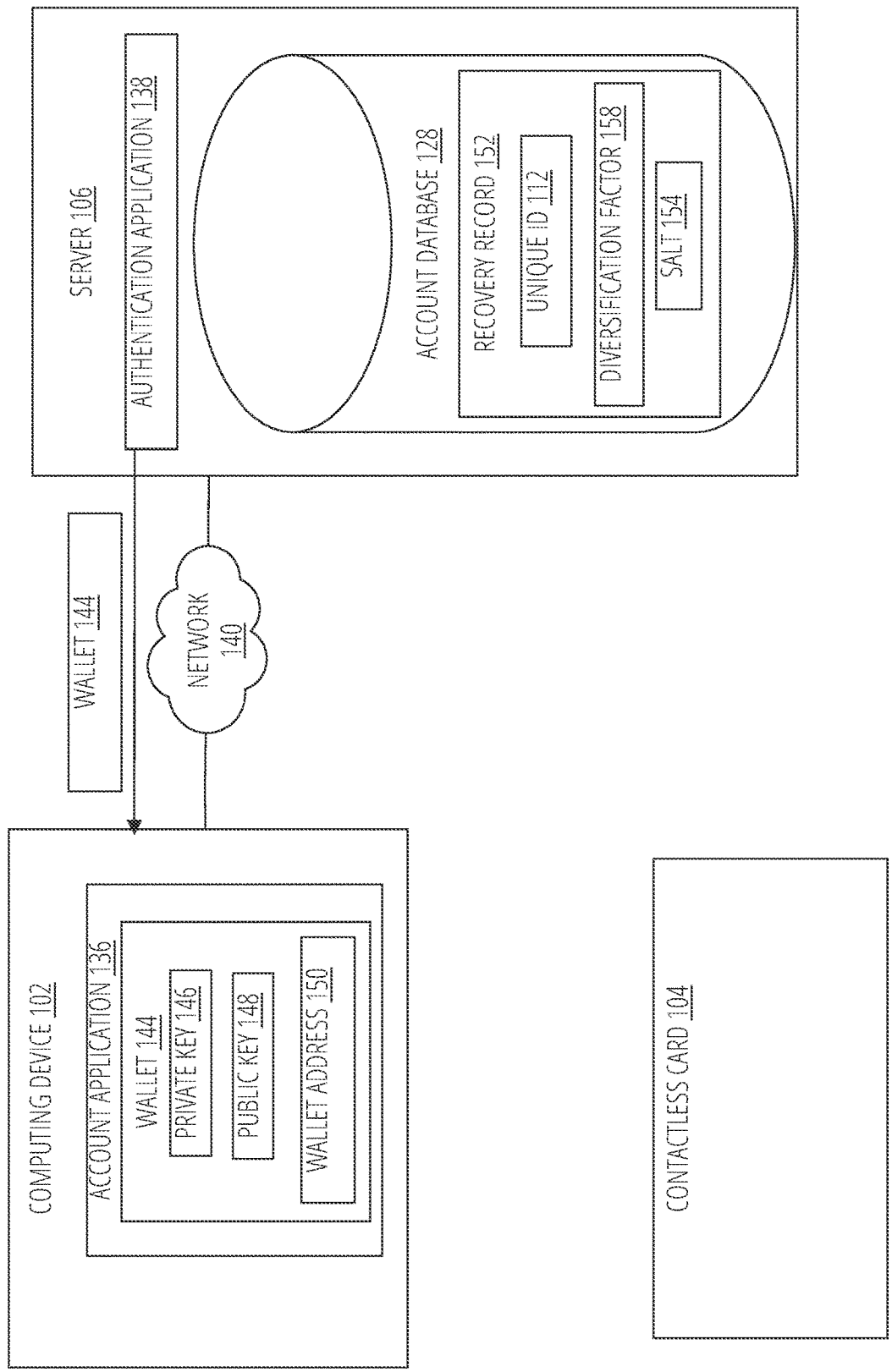
FIG. 1C illustrates an aspect of the subject matter in accordance with one embodiment.

FIG. 1C depicts an embodiment where the authentication application 138 transmits the digital wallet 144 to the computing device 102. As shown, the account application 136 may store the digital wallet 144 (in the memory 132 and/or a non-volatile storage, not pictured for the sake of clarity), which includes the private key 146, the public key 148, and the wallet address 150. The account application 136 may hash, encrypt, or otherwise obfuscate the private key 146, public key 148, and/or wallet address 150. The account application 136 may protect the digital wallet 144 with authentication controls, such as a username and/or password, biometric credentials, etc. In addition and/or alternatively, the account application 136 may require cryptogram decryption and/or verification using the contactless card 104 to access the digital wallet 144 (e.g., the contactless card 104 generates a cryptogram which is verified by the server 106 as described herein). In addition, in some embodiments, the account application 136 may require the user to provide the private key 146 to access the digital wallet 144 and/or perform operations using the digital wallet 144. More generally, the account application 136 may provide a variety of interfaces to access, use, or otherwise manage the digital wallet 144.

In some embodiments, the digital wallet 144 may be stored in a cloud-based wallet, e.g., in the server 106 or another computing system that provides cloud-based wallet services to clients. Embodiments are not limited in this context. The cloud-based wallet may provide an interface to access or otherwise use the digital wallet 144, e.g., via the account application 136.

As shown, the server 106 has created a recovery record 152 in the account database 128 based on the creation of the digital wallet 144. The recovery record 152 includes the unique ID 112, the diversification factor 158 (e.g., the counter 116 and/or the PAN sequence 156), and any salt 154 (if used) to generate the private key 146. In some embodiments, the recovery record 152 may be indexed based on the wallet address 150 of the wallet 144. In other embodiments, the recovery record 152 may be indexed based on the record 142 of the HSM 130 that stores the keys of the contactless card 104. In other embodiments, the recovery record 152 is indexed based on the unique ID 112 of the contactless card 104. The recovery record 152 may then be used to recreate the private key 146, e.g., based on the unique ID 112, diversification factor 158, and/or the salt 154 and the appropriate algorithm. In embodiments where a diversified key 120, a UDK 118, or a master key 114 are used to generate the private key 146, advantageously, the diversified key 120, UDK 118, or master key 114 are not stored in the recovery record 152 to improve security. In such embodiments, the HSM 130 may store the master key 114, UDK 118, and/or diversified key 120 used to recreate the private key 146, while the unique ID 112, diversification factor 158, and/or the salt 154 may be stored in the account database 128.

Figure 2A:
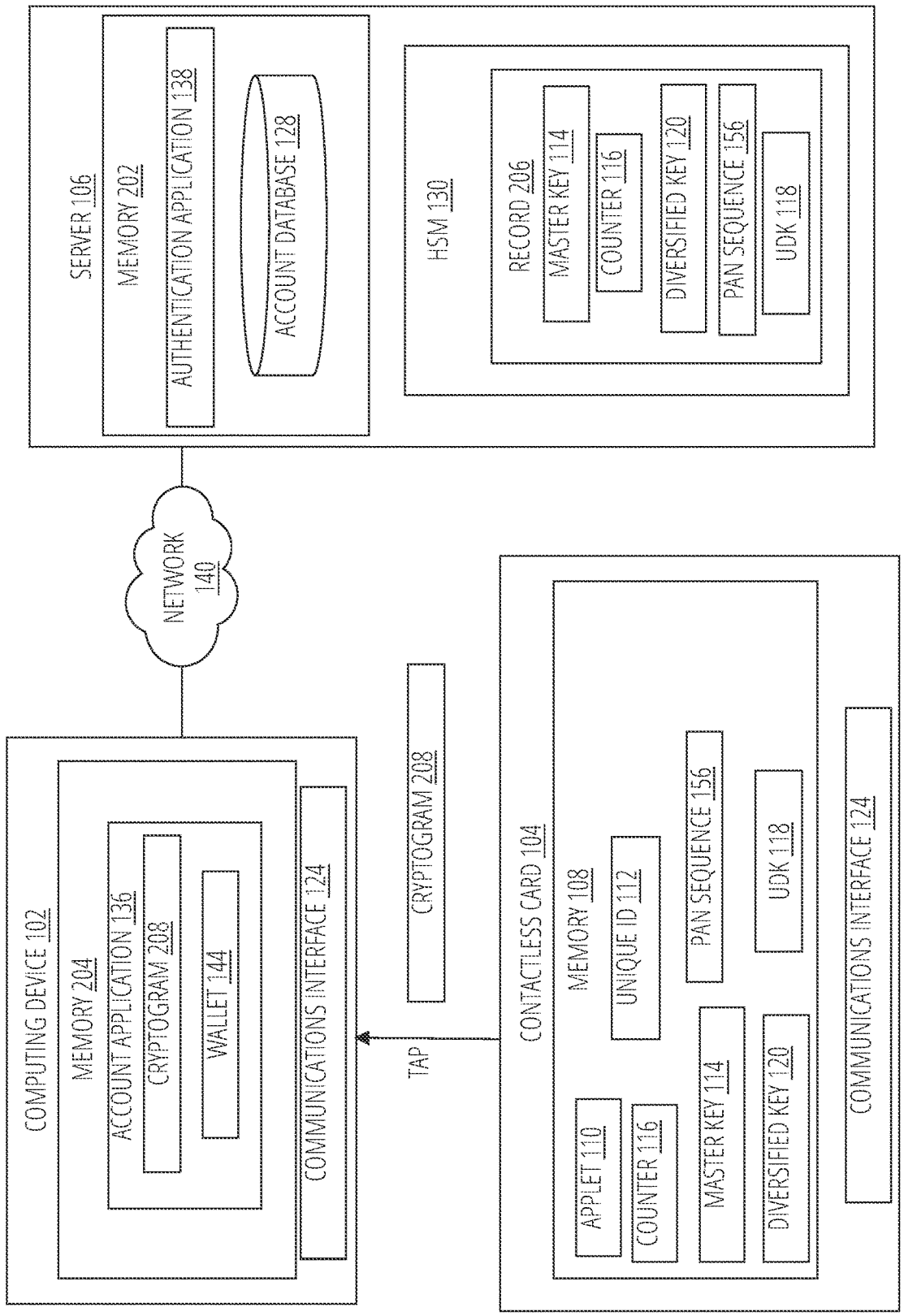
FIG. 2A illustrates an aspect of the subject matter in accordance with one embodiment.

FIG. 2A is a schematic 200 illustrating an embodiment where a user requests to recover the private key 146. As shown, to recover the private key 146, the account application 136 may instruct the user to tap the contactless card 104 to the computing device 102, which causes the contactless card 104 to generate a cryptogram 208. The cryptogram 208 may be generated as described above with reference to the cryptogram 122. For example, the applet 110 may increment the counter 116 and encrypt one or more UDKs 118, the unique ID 112, and the counter 116 to generate one or more diversified keys 120. The one or more diversified keys 120 may be used to generate a MAC based on some data and encrypt the MAC and/or the data. In some embodiments, the MAC is generated based on the wallet address 150 and one of the diversified keys 120. In such an embodiment, the wallet address 150 and the MAC are encrypted using the other one of the diversified keys 120 to generate the cryptogram 208. As another example, the public key 148 may be used to generate the MAC, and the public key 148 may be encrypted with the MAC.

Figure 2B:
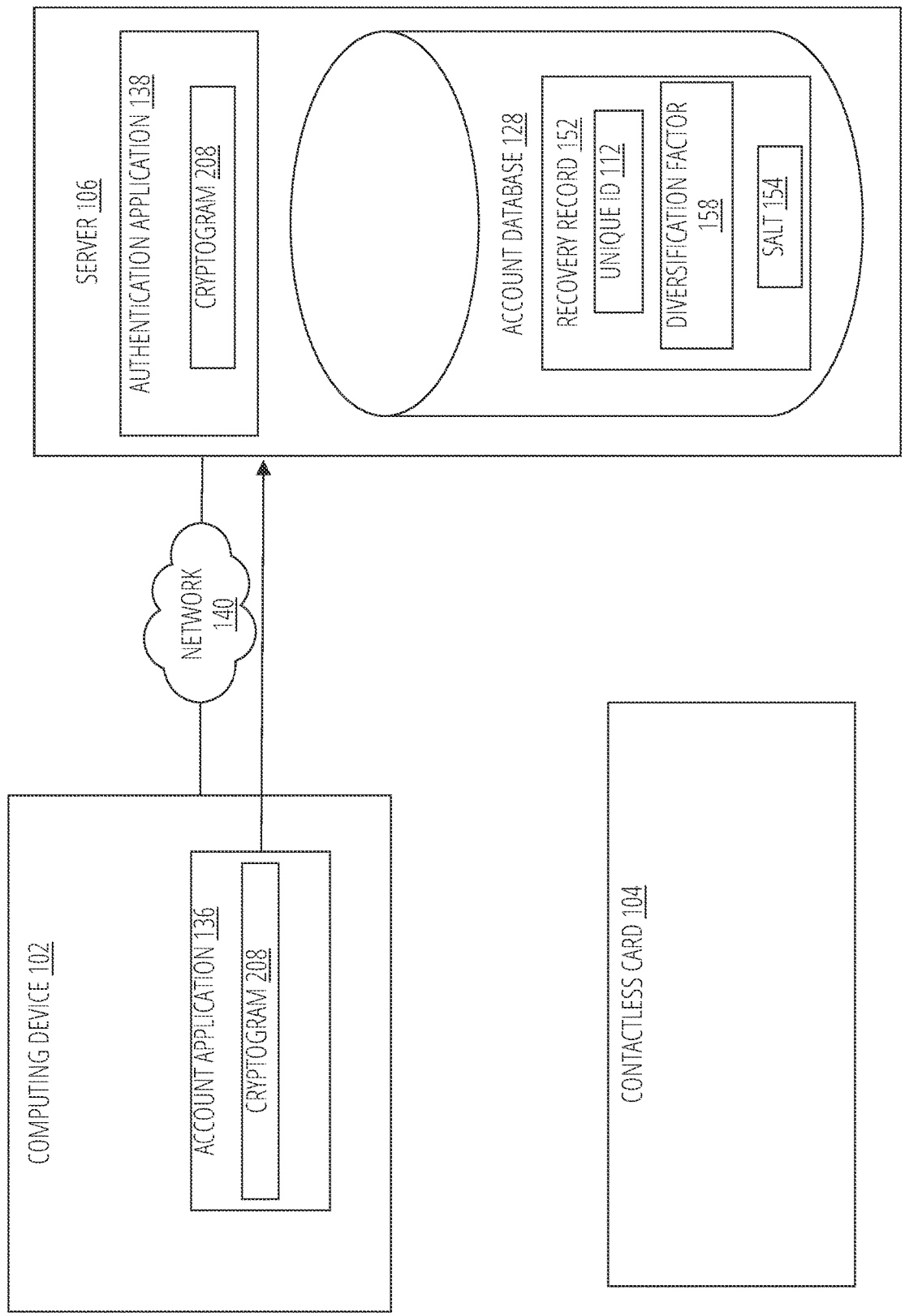
FIG. 2B illustrates an aspect of the subject matter in accordance with one embodiment.

FIG. 2B depicts an embodiment where the account application 136 transmits the cryptogram 208 to the server 106 for verification. Generally, the server 106 may increment the counter 116 and encrypt the UDK 118, the unique ID 112, and the counter 116 of the contactless card 104 to generate one or more diversified keys 120 corresponding to the keys generated by the contactless card 104. The one or more diversified keys 120 may be used to decrypt the cryptogram 208 and/or verify the MAC.

If the server 106 is able to decrypt the cryptogram 208 and/or verify the MAC, the server 106 may recreate the private key 146 based on the recovery record 152. In embodiments where the wallet address 150 is encrypted in the cryptogram 208, the recovery record 152 may be indexed (e.g., searched) based on the wallet address 150, and the server 106 may access the recovery record 152 using the decrypted wallet address 150. In embodiments where the public key 148 is encrypted in the cryptogram 208, the server 106 may regenerate the wallet address 150 using the public key 148, and index the account database 128 using the regenerated wallet address 150. In other embodiments, the account database 128 is indexed using the unique ID 112 to identify the recovery record 152. In such embodiments, the unique ID 112 is determined based on an unencrypted version of the unique ID 112 included with the cryptogram 208.

Once the server 106 identifies the recovery record 152, the recovery record 152 may be used to recreate the private key 146. For example, the unique ID 112, diversification factor 158, and salt 154 (if used) of the recovery record 152 may be provided as input to the function of the HSM 130 used to initially create the private key 146. Doing so recreates the private key 146.

In some embodiments, the server 106 further recreates the private key 146 based on the master key 114 or the UDK 118. For example, the server 106 may provide the master key 114 of the contactless card 104 and the data in the recovery record 152 (e.g., the unique ID 112, diversification factor 158, and any salt 154) as input to the function of the HSM 130 used to create the private key 146. Doing so recreates the private key 146. As another example, the server 106 may provide the UDK 118 of the contactless card 104 and the data in the recovery record 152 (e.g., the unique ID 112, diversification factor 158, and any salt 154) as input to the function of the HSM 130 used to create the private key 146. Doing so also recreates the private key 146.

In some embodiments, the UDK 118, unique ID 112, diversification factor 158, and any salt 154 are input to the function of the HSM 130 to generate the diversified key 120 used to generate the private key 146. The diversified key 120, diversification factor 158, and any salt 154 may be provided as input to the function of the HSM 130 to recreate the private key 146.

If, on the other hand, the HSM 130 is unable to decrypt the cryptogram 122 and/or verify the MAC, the HSM 130 does not validate the cryptogram 122. In such an example, the authentication application 138 determines to refrain from recovering the private key 146. The authentication application 138 may transmit an indication of the failed decryption and/or MAC verification to the computing device 102. In such embodiments, the user is restricted from recovering the private key 146 using the recovery record 152.

Figure 2C:
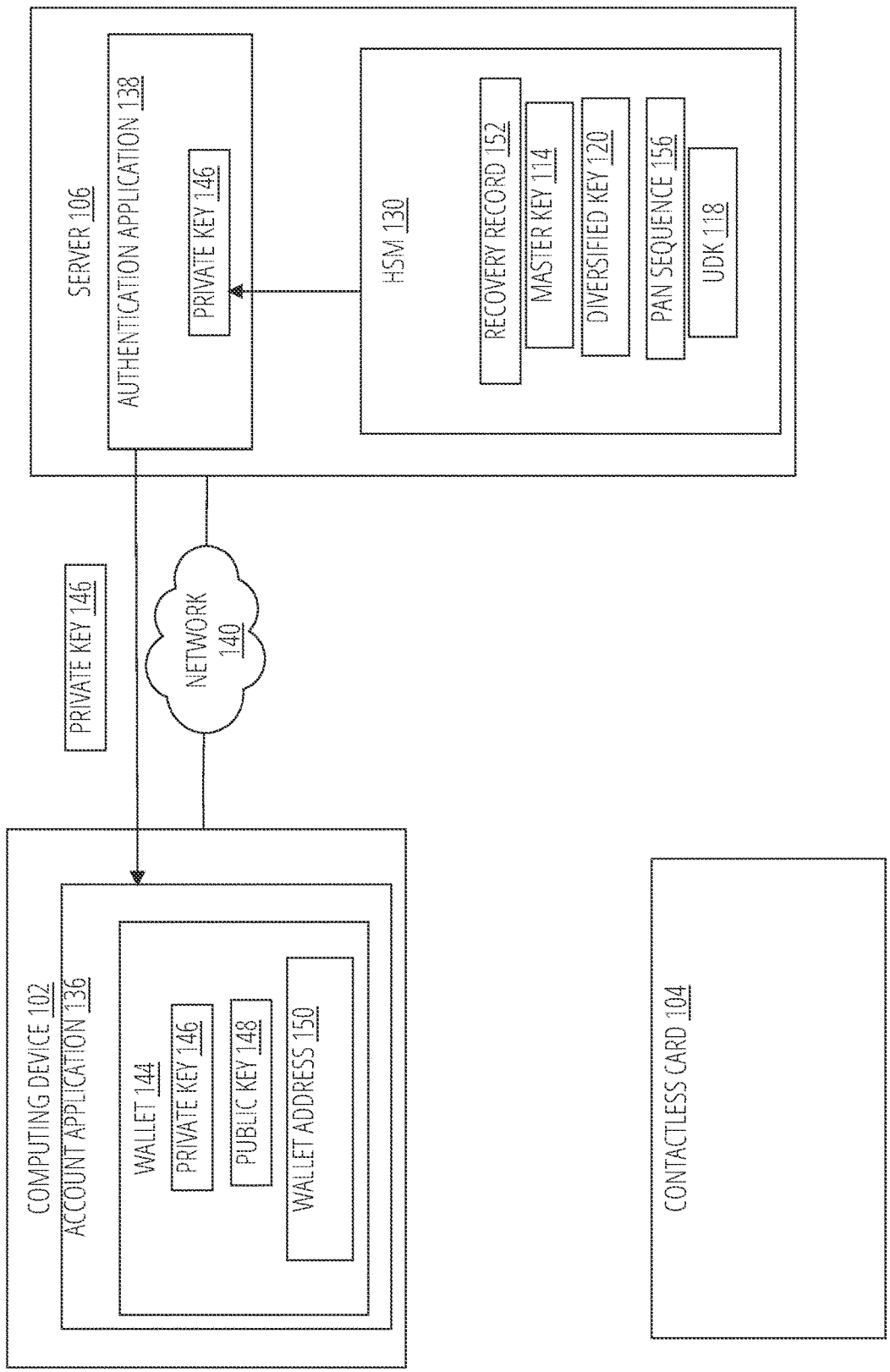
FIG. 2C illustrates an aspect of the subject matter in accordance with one embodiment.

FIG. 2C depicts an embodiment where the HSM 130 has recreated the private key 146 based on the recovery record 152 and transmits the private key 146 to the account application 136. In some embodiments, the server 106 may transmit the private key 146 in one or more data portions. More generally, the server 106 may transmit the private key 146 using a secured connection with the computing device 102. The computing device 102 may then display the private key 146, allowing the user to recover the private key 146. The user may then use the private key 146 to perform one or more operations using the digital wallet 144 and/or any cryptocurrencies associated with the digital wallet 144. For example, the private key 146 may be used to generate a transaction in a blockchain 906.

In some embodiments, the private key 146 is not transmitted to the computing device 102. For example, in a cloud-based wallet embodiment, the private key 146 may be used to sign transactions or other types of data. In such an example, the user may authenticate their account in the account application 136 using account authentication credentials and provide details of an intended transaction (e.g., a purchase, a cryptocurrency transfer, etc.). The account application 136 may provide the transaction details to the server 106. In some embodiments, the account application 136 provides the transaction details in a cryptogram and/or a data package including the cryptogram. The cryptogram may be similar to the cryptogram 122 and/or cryptogram 208. The server 106 may then retrieve the data used to diversify they keys from the recovery record 152 (e.g., the unique ID 112, the counter 116, the PAN sequence 156, and/or the salt 154). The data from the recovery record 152 may be provided to the HSM 130, which generates a digital signature for the transaction using the data from the recovery record and the master key 114 and/or the UDK 118. Doing so generates the signature required for the transaction. For example, by generating a valid signature, the transaction may be verified using the public key 148. In such examples, a transaction may be added to a blockchain to reflect the verified transaction.

Figure 3A:
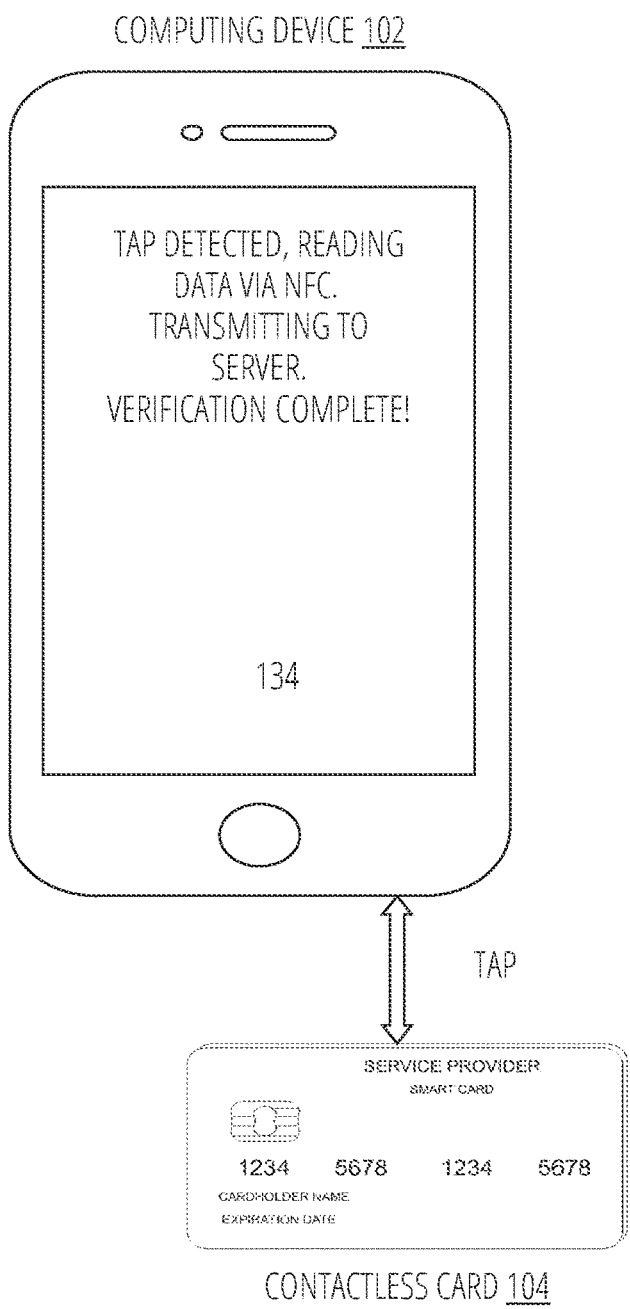
FIG. 3A illustrates an aspect of the subject matter in accordance with one embodiment.

FIG. 3A is a schematic 300a illustrating an embodiment where a contactless card 104 is tapped to a computing device 102, e.g., to recover the private key 146. As stated, when the contactless card 104 is tapped to the computing device 102, the applet 110 may generate a cryptogram (e.g., the cryptogram 122 and/or the cryptogram 208). The cryptogram and any other data (e.g., unencrypted unique ID 112) may be included in a data package, such as an NDEF file, that is read by the computing device 102. The computing device 102 may then transmit the cryptogram to the server 106 for verification (e.g., decryption and/or MAC verification) as described herein.

Figure 3B:
FIG. 3B illustrates an aspect of the subject matter in accordance with one embodiment.

FIG. 3B is a schematic 300b illustrating an embodiment where the server 106 verified the cryptogram generated in FIG. 3A. Based on the verification, the server 106 may recreate the private key 146 based on the recovery record 152. The server 106 may then transmit the private key 146 to the account application 136. As shown, the account application 136 may then display the private key 146 on the display as a string of characters. In some embodiments, a matrixed code 302 may be generated to represent the private key 146. Doing so allows the matrixed code 302 to be scanned to determine the private key 146.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
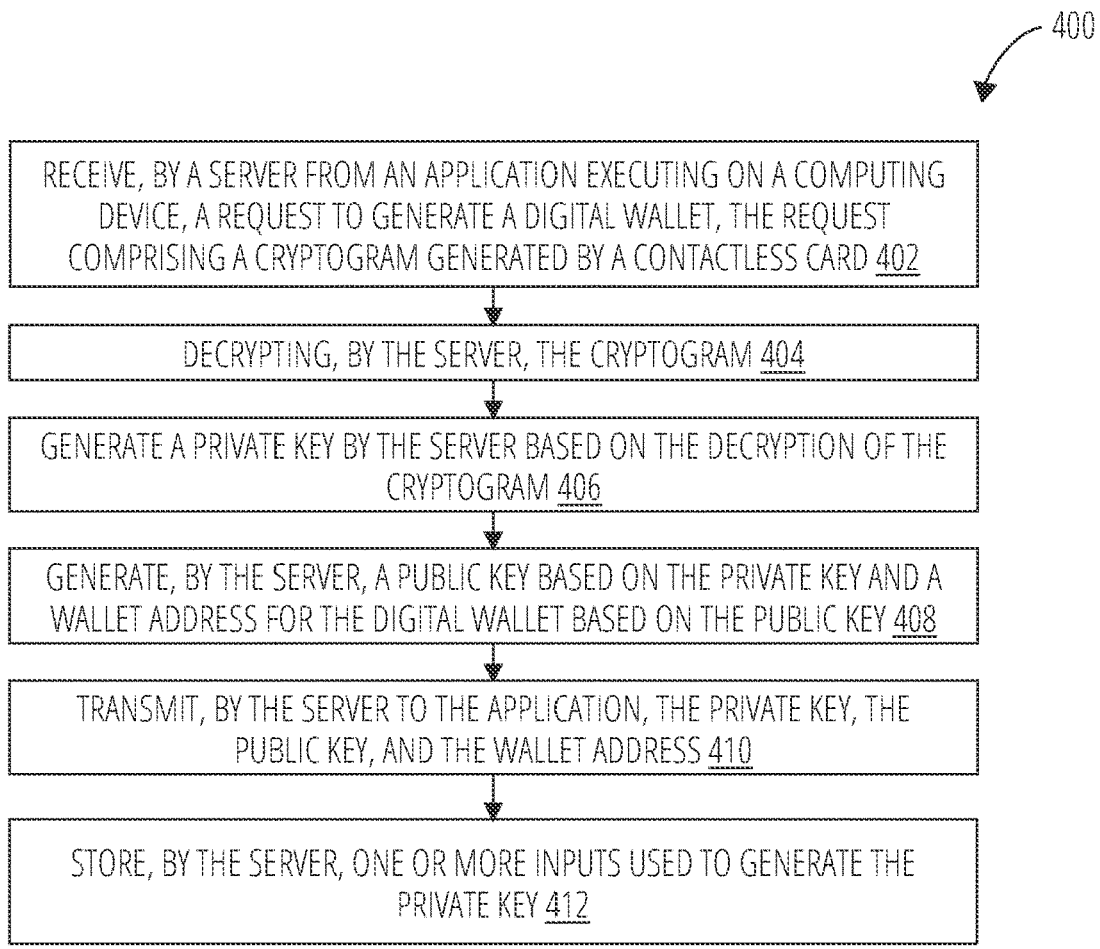
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations to create a digital wallet. Embodiments are not limited in this context.

In block 402, a server 106 may receive, from the account application 136 executing on a computing device 102, a request to generate a digital wallet. The request may include a cryptogram generated by the contactless card 104 and transmitted to the computing device 102. In block 404, the server may decrypt the cryptogram by generating one or more diversified keys 120 based on the master key 114, UDK 118, and a counter 116. The server 106 may further verify the cryptogram, e.g., determine that a MAC generated by the server 106 matches a MAC in the decrypted cryptogram.

In block 406, the server 106 generates a private key 146 based on the successful decryption and/or verification of the cryptogram at block 404. The private key 146 may be based on input to a cryptographic function of the HSM 130. The input may include the unique ID 112 and the diversification factor 158 (e.g., the counter 116 and/or a PAN sequence 156 of the contactless card 104). In some embodiments, the input may further include a master key 114, a UDK 118, and/or a diversified key 120. In block 408, the server 106 may generate a public key 148 based on the private key 146. The server may further create a wallet address 150 for the digital wallet 144 based on the public key 148. In block 410, the server may transmit, to the application, the private key 146, the public key 148, and the wallet address 150. In block 412, the server 106 stores one or more inputs used to generate the private key in the account database 128 (e.g., the unique ID 112 and diversification factor 158).

Figure 5:
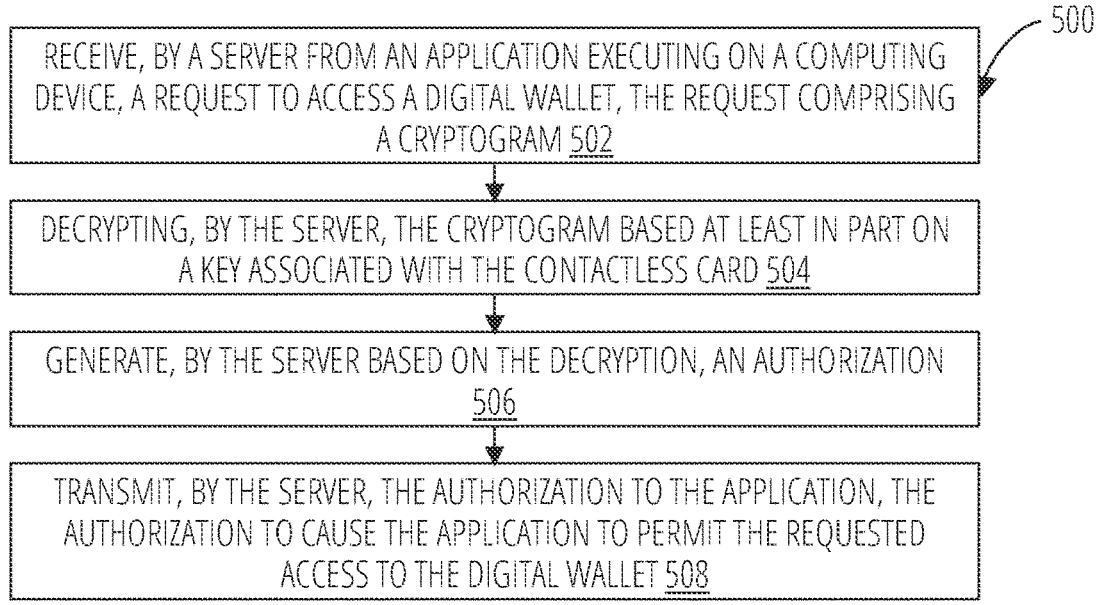
FIG. 5 illustrates a routine 500 in accordance with one embodiment.

FIG. 5 illustrates an embodiment of a logic flow, or routine, 500. The logic flow 500 may be representative of some or all of the operations executed by one or more embodiments described herein. For example, the logic flow 500 may include some or all of the operations to access a digital wallet. Embodiments are not limited in this context.

In block 502, routine 500 receives, by a server 106 from an account application 136 executing on a computing device 102, a request to access a digital wallet 144, the request comprising a cryptogram. In block 504, the server 106 may decrypt the cryptogram by generating one or more diversified keys 120 based on the master key 114, the UDK 118, and a counter 116. The server 106 may further verify the cryptogram, e.g., determine that a MAC generated by the server 106 matches a MAC in the decrypted cryptogram. In block 506, the server may generate an authorization based on the successful decryption and verification. The authorization may generally indicate that the requested access to the digital wallet 144 is to be permitted. In block 508, the server transmits the authorization to the account application 136. The authorization may cause the account application 136 to permit the requested access to the digital wallet 144. In some embodiments, however, the private key 146 is further required to access the digital wallet 144.

Figure 6:
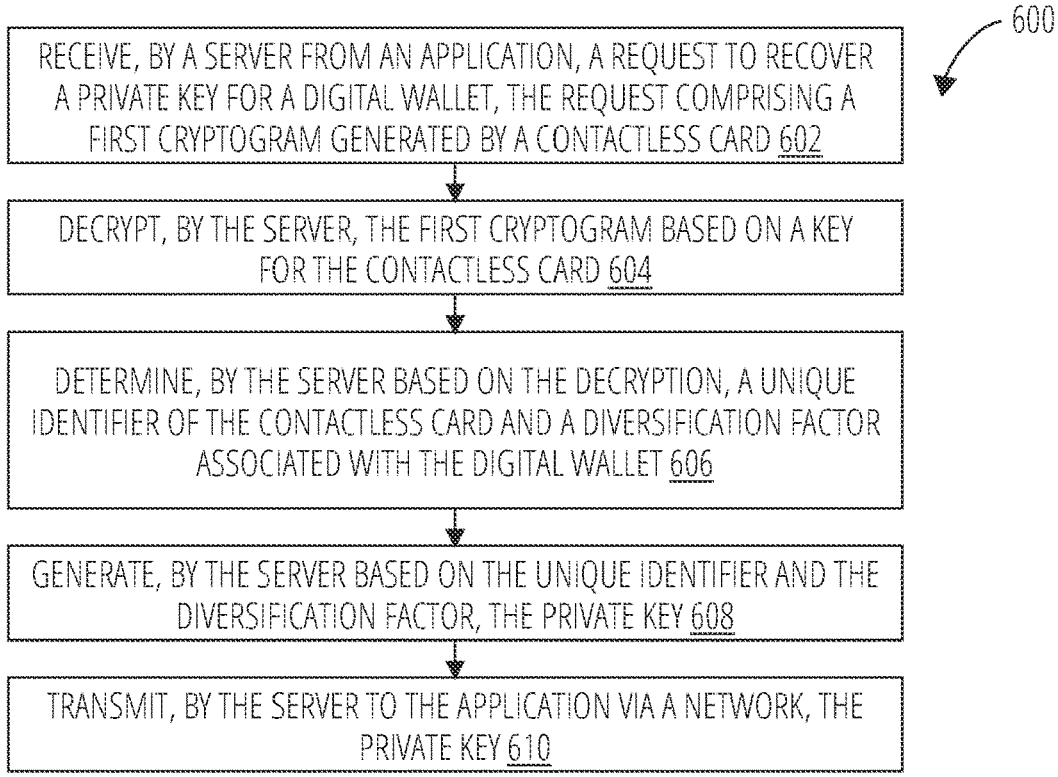
FIG. 6 illustrates a routine 600 in accordance with one embodiment.

FIG. 6 illustrates an embodiment of a logic flow, or routine, 600. The logic flow 600 may be representative of some or all of the operations executed by one or more embodiments described herein. For example, the logic flow 600 may include some or all of the operations to recover the private key for a digital wallet. Embodiments are not limited in this context.

In block 602, routine 600 receives, by a server 106 from an account application 136, a request to recover a private key 146 for a digital wallet 144. The request may comprise a cryptogram generated by a contactless card 104 based on key diversification (e.g., based on the master key 114, UDK 118, and one or more diversified keys 120). In block 604, the server 106 may decrypt the cryptogram by generating one or more diversified keys 120 based on the master key 114, the UDK 118, and a counter 116. The server 106 may further verify the cryptogram, e.g., determine that a MAC generated by the server 106 matches a MAC in the decrypted cryptogram.

In block 606, the server 106 may determine, based on the decryption and verification, a unique ID 112 of the contactless card 104 and a diversification factor 158 (e.g., a counter 116 and/or a PAN sequence 156) in the account database 128. In block 608, the server 106 recreates the private key 146 based on the unique ID 112, the diversification factor 158, and any salt 154. In some embodiments, the server 106 recreates the private key 146 based on the master key 114, the unique ID 112, the diversification factor 158, and any salt 154. In some embodiments, the server 106 recreates the private key 146 based on the UDK 118, the unique ID 112, the diversification factor 158, and any salt 154. In some embodiments, the server 106 recreates the private key 146 based on the diversified key 120, the unique ID 112, the diversification factor 158, and any salt 154. In block 610, the server 106 transmits the recreated private key 146 to the account application 136 via a network.

Figure 7A:
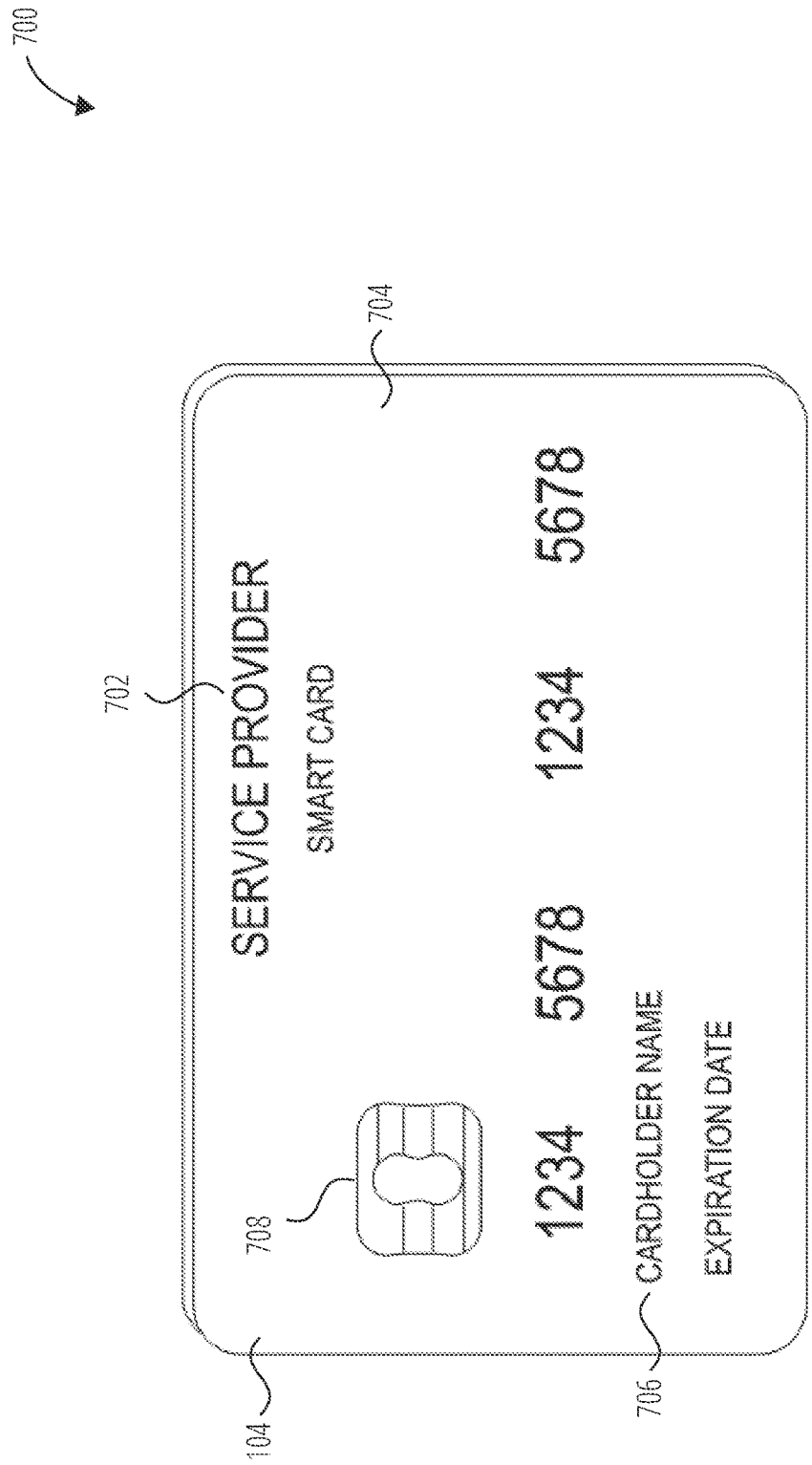
FIG. 7A illustrates a contactless card in accordance with one embodiment.

FIG. 7A is a schematic 700 illustrating an example configuration of a contactless card 104, which may include a payment card, such as a credit card, debit card, or gift card, issued by a service provider as displayed as service provider indicia 702 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 704, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

The contactless card 104 may also include identification information 706 displayed on the front and/or back of the card, and a contact pad 708. The contact pad 708 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna and other components as will be further discussed in FIG. 7B. These components may be located behind the contact pad 708 or elsewhere on the substrate 704, e.g. within a different layer of the substrate 704, and may electrically and physically coupled with the contact pad 708. The contactless card 104 may also include a magnetic strip or tape, which may be located on the back of the card (not shown in FIG. 7A). The contactless card 104 may also include a Near-Field Communication (NFC) device coupled with an antenna capable of communicating via the NFC protocol. Embodiments are not limited in this manner.

Figure 7B:
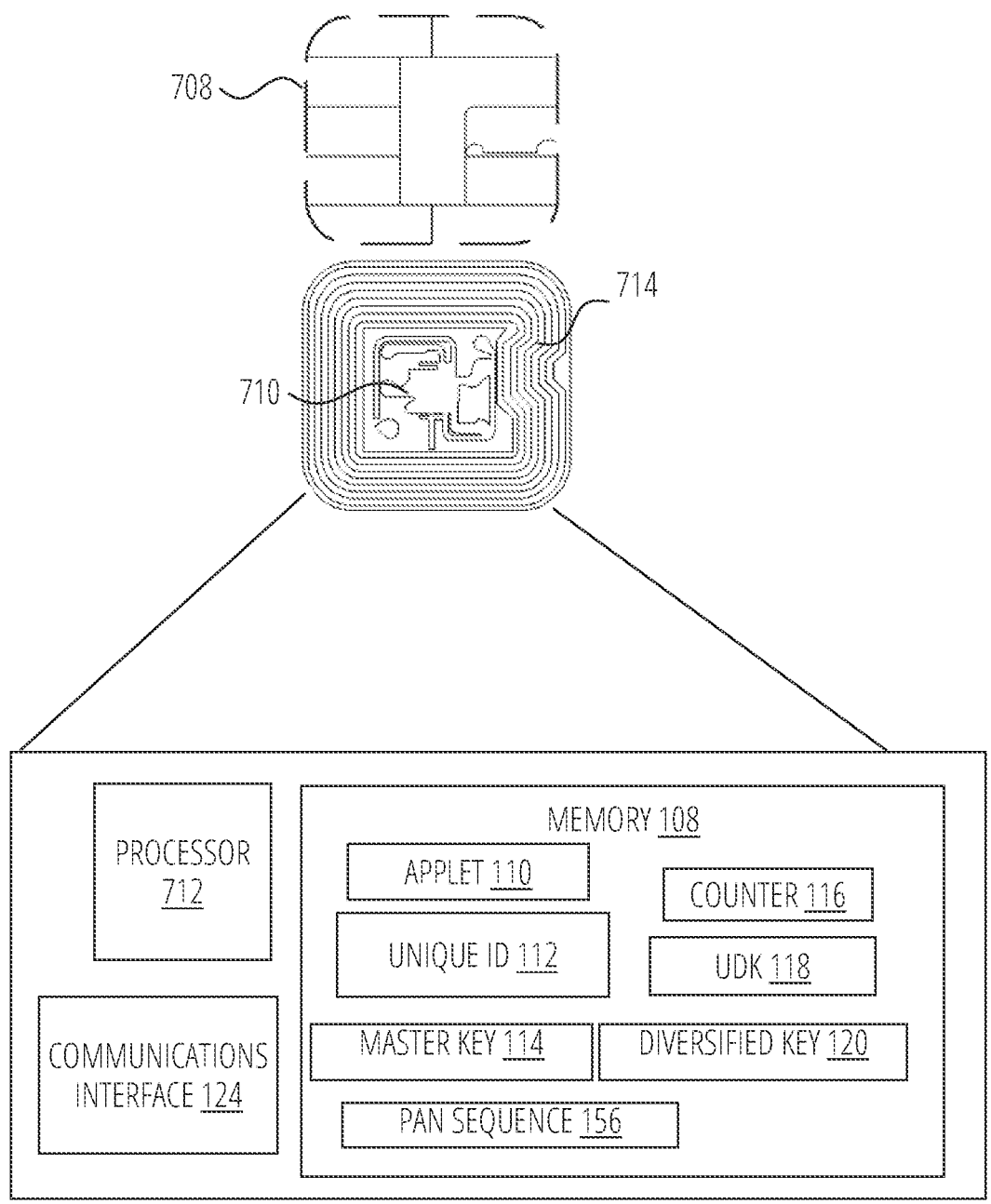
FIG. 7B illustrates a contactless card 104 in accordance with one embodiment.

As illustrated in FIG. 7B, the contact pad 708 of contactless card 104 may include processing circuitry 710 for storing, processing, and communicating information, including a processor 712, a memory 108, and one or more communications interface 124. It is understood that the processing circuitry 710 may contain additional components, including processors, memories, error and parity/CRC checkers, data encoders, anticollision algorithms, controllers, command decoders, security primitives and tamper-proofing hardware, as necessary to perform the functions described herein.

The memory 108 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 108 may be encrypted memory utilizing an encryption algorithm executed by the processor 712 to encrypted data.

The memory 108 may be configured to store one or more applet 110, one or more counters 116, a unique ID 112, the master key 114, the UDK 118, diversified key 120, and the PAN sequence 156. The one or more applets 110 may comprise one or more software applications configured to execute on one or more contactless cards 104, such as a Java® Card applet. However, it is understood that applets 110 are not limited to Java Card applets, and instead may be any software application operable on contactless cards or other devices having limited memory. The one or more counters 116 may comprise a numeric counter sufficient to store an integer. The unique ID 112 may comprise a unique alphanumeric identifier assigned to the contactless card 104, and the identifier may distinguish the contactless card 104 from other contactless cards 104. In some examples, the unique ID 112 may identify both a customer and an account assigned to that customer.

The processor 712 and memory elements of the foregoing exemplary embodiments are described with reference to the contact pad 708, but the present disclosure is not limited thereto. It is understood that these elements may be implemented outside of the contact pad 708 or entirely separate from it, or as further elements in addition to processor 712 and memory 108 elements located within the contact pad 708.

In some examples, the contactless card 104 may comprise one or more antenna(s) 714. The one or more antenna(s) 714 may be placed within the contactless card 104 and around the processing circuitry 710 of the contact pad 708. For example, the one or more antenna(s) 714 may be integral with the processing circuitry 710 and the one or more antenna(s) 714 may be used with an external booster coil. As another example, the one or more antenna(s) 714 may be external to the contact pad 708 and the processing circuitry 710.

In an embodiment, the coil of contactless card 104 may act as the secondary of an air core transformer. The terminal may communicate with the contactless card 104 by cutting power or amplitude modulation. The contactless card 104 may infer the data transmitted from the terminal using the gaps in the power connection of the contactless card 104, which may be functionally maintained through one or more capacitors. The contactless card 104 may communicate back by switching a load on the coil of the contactless card 104 or load modulation. Load modulation may be detected in the terminal's coil through interference. More generally, using the antenna(s) 714, processor 712, and/or the memory 108, the contactless card 104 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet 110 may be added to contactless cards to provide a one-time password (OTP) for multifactor authentication (MFA) in various mobile application-based use cases. Applet 110 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include a cryptogram such as the cryptogram 122 or cryptogram 208, and any other data.

One example of an NDEF OTP is an NDEF short-record layout (SR=1). In such an example, one or more applet 110 may be configured to encode the OTP as an NDEF type 4 well known type text tag. In some examples, NDEF messages may comprise one or more records. The applet 110 may be configured to add one or more static tag records in addition to the OTP record.

In some examples, the one or more applet 110 may be configured to emulate an RFID tag. The RFID tag may include one or more polymorphic tags. In some examples, each time the tag is read, different cryptographic data is presented that may indicate the authenticity of the contactless card. Based on the one or more applet 110, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter 116 may be configured to increment. In some examples, each time data from the contactless card 104 is read (e.g., by a mobile device), the counter 116 is transmitted to the server for validation and determines whether the counter 116 are equal (as part of the validation) to a counter of the server.

The one or more counter 116 may be configured to prevent a replay attack. For example, if a cryptogram has been obtained and replayed, that cryptogram is immediately rejected if the counter 116 has been read or used or otherwise passed over. If the counter 116 has not been used, it may be replayed. In some examples, the counter that is incremented on the contactless card 104 is different from the counter that is incremented for transactions. The contactless card 104 is unable to determine the application transaction counter 116 since there is no communication between applets 110 on the contactless card 104. In some examples, the contactless card 104 may comprise a first applet 440-1, which may be a transaction applet, and a second applet 440-2. Each applet 440-1 and 440-2 may comprise a respective counter 116.

In some examples, the counter 116 may get out of sync. In some examples, to account for accidental reads that initiate transactions, such as reading at an angle, the counter 116 may increment but the application does not process the counter 116. In some examples, when the device 102 is woken up, NFC may be enabled and the computing device 102 may be configured to read available tags, but no action is taken responsive to the reads.

To keep the counter 116 in sync, an application, such as a background application, may be executed that would be configured to detect when the computing device 102 wakes up and synchronize with the server of a banking system indicating that a read that occurred due to detection to then move the counter 116 forward. In other examples, Hashed One Time Password may be utilized such that a window of mis-synchronization may be accepted. For example, if within a threshold of 10, the counter 116 may be configured to move forward. But if within a different threshold number, for example within 10 or 600, a request for performing re-synchronization may be processed which requests via one or more applications that the user tap, gesture, or otherwise indicate one or more times via the user's device. If the counter 116 increases in the appropriate sequence, then it possible to know that the user has done so.

The key diversification technique described herein with reference to the counter 116, master key 114, UDK 118, and diversified key 120, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys (e.g., the UDKs 118) and the counter may be used as diversification data. For example, each time the contactless card 104 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 8:
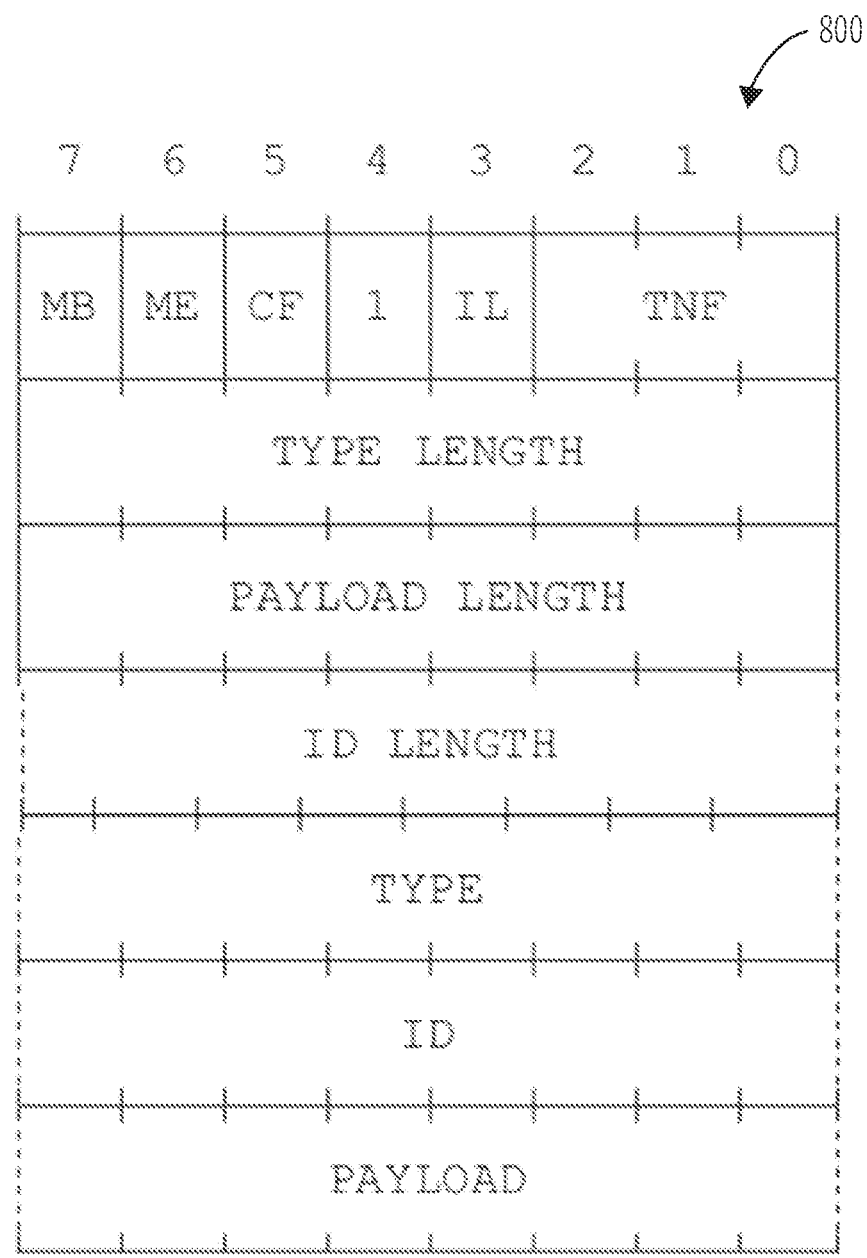
FIG. 8 illustrates a data structure 800 in accordance with one embodiment.

FIG. 8 illustrates an NDEF short-record layout (SR=1) data structure 800 according to an example embodiment. One or more applets 110 may be configured to encode an OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 800 may include a cryptogram such as cryptogram 122 or cryptogram 208, and any other data provided by the applet 110.

Figure 9:
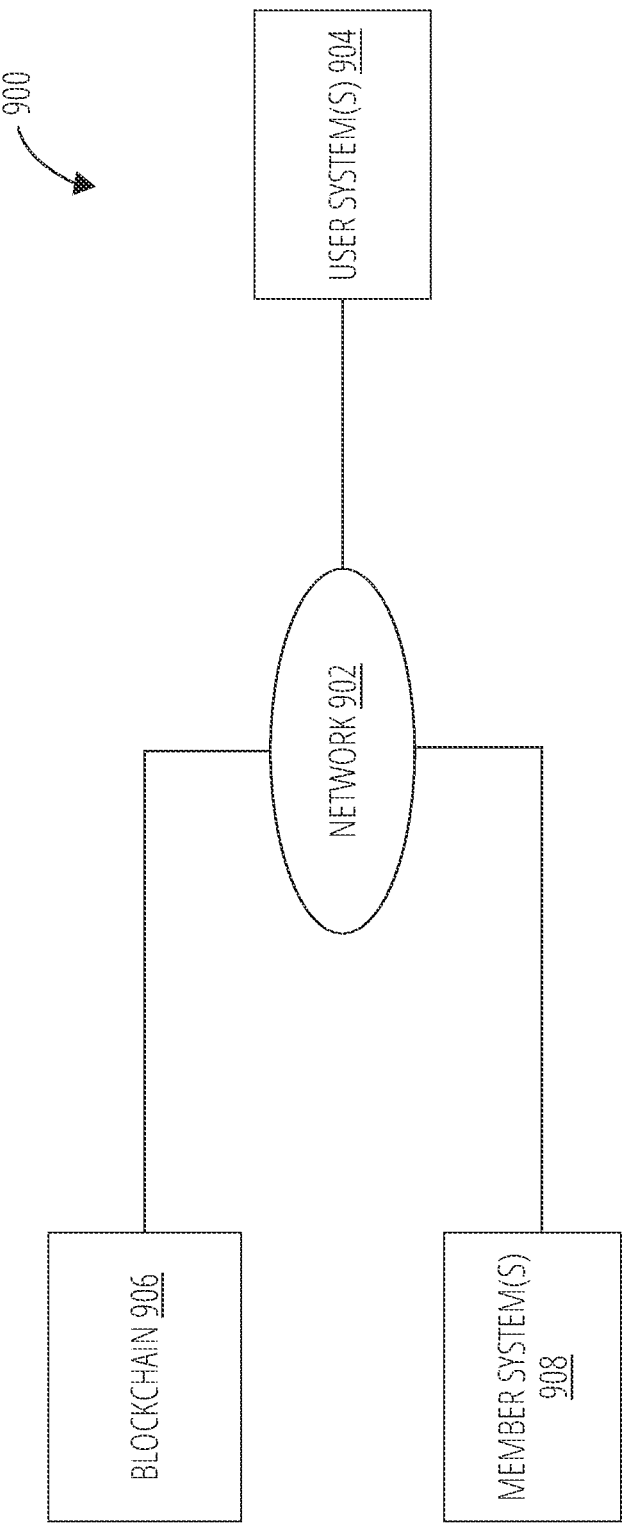
FIG. 9 illustrates an example of a system 900 in accordance with embodiments.

FIG. 9 depicts a schematic of an exemplary system 900, consistent with disclosed embodiments. The system 900 may comprise systems with access to blockchain 906 over network 902.

The system 900 can generate a non-reputable record of interactions using the blockchain 906. Furthermore, the blockchain 906 can be distributed across a plurality of computing systems, encouraging trust in the validity of the records stored in the blockchain 906. In this manner, the disclosed systems provide an innovative technical solution to at least the above-mentioned technical problems with conventional systems.

User system(s) 904 may include the computing device 102. User system(s) 904 may be configured to process transactions using the digital wallet 144, consistent with disclosed embodiments. User system 904 may comprise a computing device, such as a server, workstation, desktop, or mobile device (e.g., laptop, tablet, phablet, smartphone, smartwatch, or similar mobile computing device). As described below with respect to FIG. 12, user system 904 may be configured with a display and input/output interfaces. User system 904 may be configured to interact with a user (not shown) using the display and input/output interfaces.

Member system 908 may be configured to process transactions, consistent with disclosed embodiments. Member system 908 may include one or more computing devices, such as servers, workstations, desktop computers, or special-purpose computing devices. Member system 908 may be standalone, or it may be part of a subsystem, which may be part of a larger system. For example, member system 908 may be associated with a commercial institution. Member system 908 may include distributed servers that are remotely located and communicate with other systems of the financial institution over a public network, or over a dedicated private network.

Member system 908 may be configured to receive a request to process a transaction using cryptocurrency of a digital wallet 144. In some embodiments, member system 908 may be configured to receive the request from another element of the system 900, such as another member system 908 and/or a user system 904. Member system 908 may be configured to interact with blockchain 906 to process the transaction request.

Member system 908 may be configured to store messages in blockchain 906, consistent with disclosed embodiments. In some aspects, member system 908 may be configured to add blocks containing the messages to blockchain 906. In various aspects, member system 908 may be configured to provide the messages to an authorized system. The authorized system may be configured to add blocks containing the messages to blockchain 906. As described below with regards to FIG. 10, the messages may comprise transaction records.

Blockchain 906 may comprise a distributed data structure, consistent with disclosed embodiments. Blockchain 906 may be a private blockchain. For example, authorized systems may store copies of blockchain 906. These authorized systems may be configured to add blocks to blockchain 906 and publish the blocks to other authorized systems. Authorized systems may be configured to receive messages from other systems for publication in blockchain 906. These other systems may have read-only access to blockchain 906. In some embodiments, one or more member systems 908 are authorized systems. In some embodiments, one or more user systems 904 are authorized systems. As described in detail with respect to FIG. 9, blockchain 906 may be configured to store messages from member systems, the messages including transactions.

Network 902 may be configured to provide communications between components of FIG. 9. For example, network 902 may be any type of network (including infrastructure) that provides communications, exchanges information, and/or facilitates the exchange of information, such as the Internet, a Local Area Network, or other suitable connection(s) that enables authentication system 900 to send and receive information between the components of authentication system 900.

Figure 10:
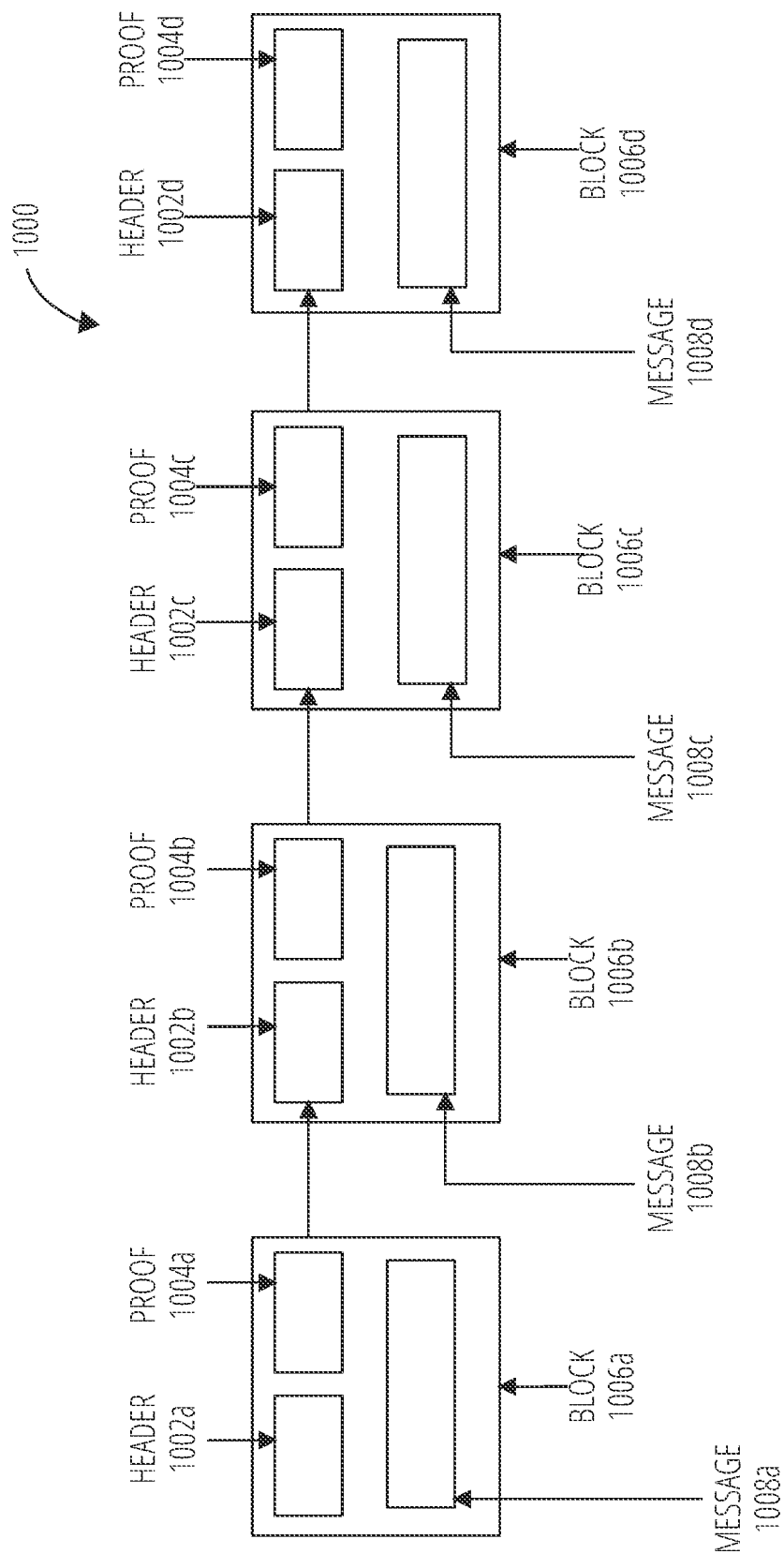
FIG. 10 illustrates an example of a logical model 1000 in accordance with embodiments.

FIG. 10 depicts a logical model 1000 of an exemplary blockchain 906, consistent with disclosed embodiments. Blockchain 906 may comprise many such blockchains maintained by many different systems (e.g., member systems 908, or other systems). Such exemplary blockchains may comprise blocks, such as block 1006a through block 1006d. Blocks may include messages, such as message 1008a through message 1008d. Generally, blocks may include a header, such as headers 1002a through 1002d, which uniquely identifies each block. The headers 1002a through 1002d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, system 900 may require that blocks added to blockchain 906 satisfy at least one of a proof-of-work condition and a digital signature condition. For example, the headers 1002a through 1002d may include a nonce chosen to ensure the header satisfies the proof-of-work condition 1004a through 1004d. As a non-limiting example, the proof-of-work condition 1004a through 1004d may require the hash of the header fall within a predetermined range of values. As an additional example, the header may be digitally signed with a cryptographic key (e.g., a private key 146) of an authorized system, and the digital signature may be included in the header. This digital signature may be verified using a key available to the members of system 900.

Figure 11:
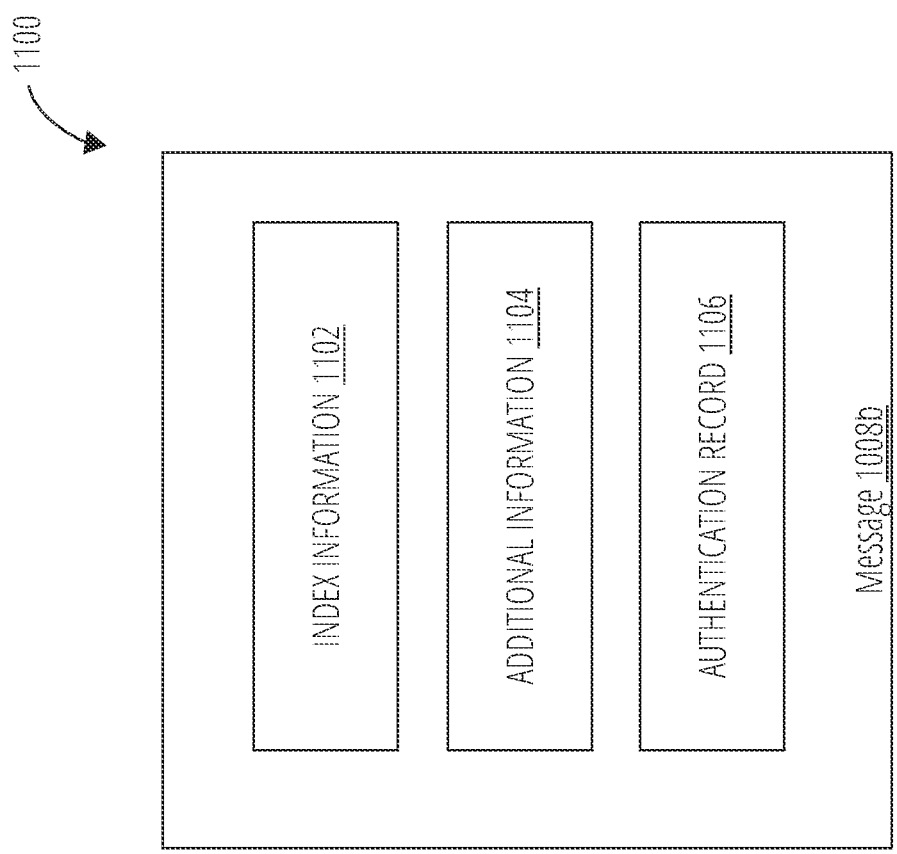
FIG. 11 illustrates an example of a logical model 1100 in accordance with embodiments.

FIG. 11 depicts a logical model 1100 of a message 1008b stored in a blockchain (e.g., an element of blockchain 906), consistent with disclosed embodiments. In some embodiments, message 1008b may comprise index information 1102. In certain aspects, index information 1102 may comprise information identifying a user. For example, index information 1102 may be at least one of a full name, email address, phone number, or other non-sensitive personal information of the user. In various aspects, index information 1102 may include one or more references to earlier blocks in the private blockchain. For example, index information 1102 may include one or more references to one or more earlier blocks associated with the same user. A reference may include, as a non-limiting example, a hash of a preceding block in the blockchain associated with the same user. In some aspects, index information 1102 may be obfuscated or encrypted according to methods known to one of skill in the art. For example, index information 1102 may be encrypted with a cryptographic key, such as the private key 146. As an additional example, index information 1102 may comprise a hash of the at least one of a full name, email address, phone number, or other non-sensitive personal information of the user.

Message 1008b may comprise additional information 1104, consistent with disclosed embodiments. The additional information 1104 may include transaction details, e.g., an amount of cryptocurrency being transferred from one digital wallet 144 to another digital wallet 144. In various aspects, additional information 1104 may be obfuscated or encrypted according to methods known to one of skill in the art. For example, root system information 1104 may be encrypted with a cryptographic key such as the private key 146.

Message 1008b may comprise authentication record 1106, consistent with disclosed embodiments. In some aspects, authentication record 1106 may comprise information enabling subsequent auditing of transactions. For example, authentication record 1106 may identify at least one of member system 908, a commercial institution associated with member system 908, a purpose of the authentication record 1106 (e.g., transaction details). In some aspects, authentication record 1106 may be obfuscated or encrypted according to methods known to one of skill in the art. For example, authentication record 1106 may be encrypted with a cryptographic key, such as the private key 146.

Cryptographic keys such as the private keys 146 may be used to encrypt elements of messages in blocks, consistent with disclosed embodiments. In some aspects, such cryptographic keys may be associated with members of authentication system 900 (e.g., member system 908). In various aspects, at least some of the cryptographic keys may be associated with authorized systems. Corresponding cryptographic keys such as the public keys 148 may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key 146, a corresponding public key 148 may be available for decrypting the encrypted element. In some aspects, the corresponding cryptographic keys may be available to members of authentication system (e.g., member systems 908).

Figure 12:
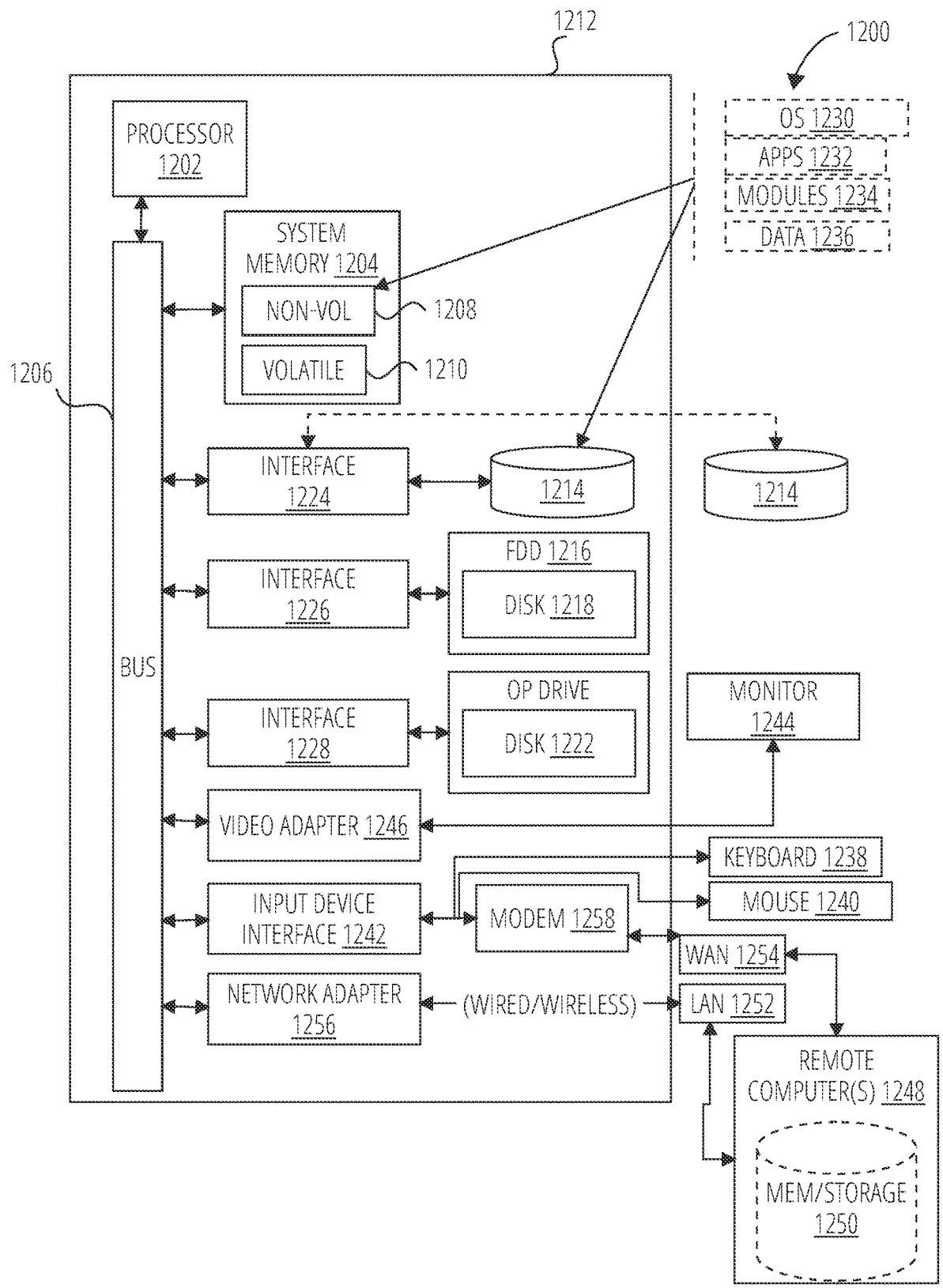
FIG. 12 illustrates a computer architecture 1200 in accordance with one embodiment.

FIG. 12 illustrates an embodiment of an exemplary computer architecture 1200 suitable for implementing various embodiments as previously described. In one embodiment, the computer architecture 1200 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 1200.

As shown in FIG. 12, the computer architecture 1200 includes a computer 1212 comprising a processor 1202, a system memory 1204 and a system bus 1206. The processor 1202 can be any of various commercially available processors. The computer 1212 may be representative of the computing device 102 and/or the server 106.

The system bus 1206 provides an interface for system components including, but not limited to, the system memory 1204 to the processor 1202. The system bus 1206 can be any of several types of bus structure that may further interconnect to a memory bus (with or without a memory controller), a peripheral bus, and a local bus using any of a variety of commercially available bus architectures. Interface adapters may connect to the system bus 1206 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1200 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1204 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1204 can include non-volatile 1208 and/or volatile 1210. A basic input/output system (BIOS) can be stored in the non-volatile 1208.

The computer 1212 may include various types of computer-readable storage media in the form of one or more lower speed memory units, including an internal (or external) hard disk drive 1214, a magnetic disk drive 1216 to read from or write to a removable magnetic disk 1218, and an optical disk drive 1220 to read from or write to a removable optical disk 1222 (e.g., a CD-ROM or DVD). The hard disk drive 1214, magnetic disk drive 1216 and optical disk drive 1220 can be connected to the system bus 1206 by an HDD interface 1224, and FDD interface 1226 and an optical disk drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1208, and volatile 1210, including an operating system 1230, one or more applications 1232, other program modules 1234, and program data 1236. In one embodiment, the one or more applications 1232, other program modules 1234, and program data 1236 can include, for example, the various applications and/or components of the system 100.

A user can enter commands and information into the computer 1212 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1202 through an input device interface 1242 that is coupled to the system bus 1206 but can be connected by other interfaces such as a parallel port, IEEE 1394 serial port, a game port, a USB port, an IR interface, and so forth.

A monitor 1244 or other type of display device is also connected to the system bus 1206 via an interface, such as a video adapter 1246. The monitor 1244 may be internal or external to the computer 1212. In addition to the monitor 1244, a computer typically includes other peripheral output devices, such as speakers, printers, and so forth.

The computer 1212 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all the elements described relative to the computer 1212, although, for purposes of brevity, only a memory and/or storage device 1250 is illustrated. The logical connections depicted include wire/wireless connectivity to a local area network 1252 and/or larger networks, for example, a wide area network 1254. Such LAN and WAN networking environments are commonplace in offices and companies, and facilitate enterprise-wide computer networks, such as intranets, all of which may connect to a global communications network, for example, the Internet.

When used in a local area network 1252 networking environment, the computer 1212 is connected to the local area network 1252 through a wire and/or wireless communication network interface or network adapter 1256. The network adapter 1256 can facilitate wire and/or wireless communications to the local area network 1252, which may also include a wireless access point disposed thereon for communicating with the wireless functionality of the network adapter 1256.

When used in a wide area network 1254 networking environment, the computer 1212 can include a modem 1258, or is connected to a communications server on the wide area network 1254 or has other means for establishing communications over the wide area network 1254, such as by way of the Internet. The modem 1258, which can be internal or external and a wire and/or wireless device, connects to the system bus 1206 via the input device interface 1242. In a networked environment, program modules depicted relative to the computer 1212, or portions thereof, can be stored in the remote memory and/or storage device 1250. It will be appreciated that the network connections shown are exemplary and other means of establishing a communications link between the computers can be used.

The computer 1212 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-12 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by a server from an application, a request to recover a private key for a digital wallet, the request comprising a first encrypted data generated by a contactless card based on a key for the contactless card;
   decrypting, by the server, the first encrypted data based on a copy of the key for the contactless card;
   determining, by the server based on the decryption of the first encrypted data, a unique identifier of the contactless card and a diversification factor associated with the digital wallet;
   generating, by the server based on the unique identifier and the diversification factor, the private key; and
   transmitting, by the server to the application via a network, the private key.

2. The method of claim 1, wherein the diversification factor comprises a primary account number (PAN) sequence number of the contactless card.

3. The method of claim 1, wherein the diversification factor comprises an application transaction counter (ATC) of the contactless card.

4. The method of claim 1, further comprising prior to receiving the request:
   receiving, by the server from the application, a second encrypted data generated by the contactless card;
   decrypting, by the server, the second encrypted data;
   generating the private key by the server based on the decryption of the second encrypted data;
   generating, by the server, a public key based on the private key and a wallet address for the digital wallet based on the public key; and
   transmitting, by the server to the application, the private key, the public key, and the wallet address.

5. The method of claim 4, wherein the unique identifier of the contactless card and the diversification factor are determined based on the wallet address of the digital wallet.

6. The method of claim 5, further comprising generating the wallet address of the digital wallet based on the decryption of the first encrypted data.

7. The method of claim 1, wherein the server further determines a salt value associated with the digital wallet, wherein the server further generates the private key based on the salt value, the method further comprising:
accessing, by the application based on the private key, the digital wallet.

8. A non-transitory computer-readable storage medium, the computer-readable storage medium including instructions that when executed by a processor, cause the processor to:
   receive, from an application, a request to recover a private key for a digital wallet, the request comprising a first encrypted data generated by a contactless card based on a key for the contactless card;
   decrypt the first encrypted data based on a copy of the key for the contactless card;
   determine, based on the decryption of the first encrypted data, a unique identifier of the contactless card and a diversification factor associated with the digital wallet;
   generate, based on the unique identifier and the diversification factor, the private key; and
   transmit the private key to the application via a network.

9. The computer-readable storage medium of claim 8, wherein the diversification factor comprises a primary account number (PAN) sequence number of the contactless card.

10. The computer-readable storage medium of claim 8, wherein the diversification factor comprises an application transaction counter (ATC) of the contactless card.

11. The computer-readable storage medium of claim 8, wherein the instructions further cause the processor to, prior to receiving the request:
    receive, from the application, a second encrypted data generated by the contactless card;
    decrypt the second encrypted data;
    generate the private key based on the decryption of the second encrypted data;
    generate a public key based on the private key and a wallet address for the digital wallet based on the public key; and
    transmit, to the application, the private key, the public key, and the wallet address.

12. The computer-readable storage medium of claim 11, wherein the unique identifier of the contactless card and the diversification factor are determined based on the wallet address of the digital wallet.

13. The computer-readable storage medium of claim 12, wherein the instructions further cause the processor to generate the wallet address of the digital wallet based on the decryption of the first encrypted data.

14. The computer-readable storage medium of claim 8, wherein the processor further determines a salt value associated with the digital wallet, wherein the processor further generates the private key based on the salt value.

15. A computing apparatus comprising:
    a processor; and
    a memory storing instructions that, when executed by the processor, cause the processor to:
       receive, from an application, a request to recover a private key for a digital wallet, the request comprising a first encrypted data generated by a contactless card based on a key for the contactless card;
       decrypt the first encrypted data based on a copy of the key for the contactless card;
       determine, based on the decryption of the first encrypted data, a unique identifier of the contactless card and a diversification factor associated with the digital wallet;
       generate, based on the unique identifier and the diversification factor, the private key; and transmit the private key to the application via a network.

16. The computing apparatus of claim 15, wherein the diversification factor comprises a primary account number (PAN) sequence number of the contactless card.

17. The computing apparatus of claim 15, wherein the diversification factor comprises an application transaction counter (ATC) of the contactless card.

18. The computing apparatus of claim 15, wherein the instructions further cause the processor to prior to receiving the request:
   receive, from the application, a second encrypted data generated by the contactless card;
   decrypt the second encrypted data;
   generate the private key based on the decryption of the second encrypted data;
   generate a public key based on the private key and a wallet address for the digital wallet based on the public key; and
   transmit, to the application, the private key, the public key, and the wallet address.

19. The computing apparatus of claim 18, wherein the unique identifier of the contactless card and the diversification factor are determined based on the wallet address of the digital wallet, wherein the instructions further configure the processor to generate the wallet address of the digital wallet based on the decryption of the first encrypted data.

20. The computing apparatus of claim 15, wherein the processor further determines a salt value associated with the digital wallet, wherein the processor further generates the private key based on the salt value.

* * * * *